(12) United States Patent
Lee et al.

(10) Patent No.: US 10,903,756 B2
(45) Date of Patent: Jan. 26, 2021

(54) SINGLE-STAGE SINGLE-INDUCTOR MULTIPLE-OUTPUT (SIMO) INVERTER TOPOLOGY WITH PRECISE AND INDEPENDENT AMPLITUDE CONTROL FOR EACH AC OUTPUT

(71) Applicant: THE UNIVERSITY OF HONG KONG, Hong Kong (CN)

(72) Inventors: Ting Leung Albert Lee, Hong Kong (CN); Weijian Jin, Hong Kong (CN); Sinan Li, Hong Kong (CN); Siew Chong Tan, Hong Kong (CN); Shu Yuen Ron Hui, Hong Kong (CN)

(73) Assignee: The University of Hong Kong, Hong Kong (CN)

( * ) Notice: Subject to any disclaimer, the term of this patent is extended or adjusted under 35 U.S.C. 154(b) by 0 days.

(21) Appl. No.: 16/469,781

(22) PCT Filed: Dec. 14, 2016

(86) PCT No.: PCT/CN2016/109910
§ 371 (c)(1),
(2) Date: Jun. 14, 2019

(87) PCT Pub. No.: WO2018/107392
PCT Pub. Date: Jun. 21, 2018

(65) Prior Publication Data
US 2020/0091836 A1   Mar. 19, 2020

(51) Int. Cl.
*H02M 7/537* (2006.01)
*H02M 7/48* (2007.01)
(Continued)

(52) U.S. Cl.
CPC .......... *H02M 7/4826* (2013.01); *H02J 7/025* (2013.01); *H02J 50/12* (2016.02); *H02M 7/537* (2013.01); *H02M 2001/009* (2013.01)

(58) Field of Classification Search
CPC .......... H02M 7/42; H02M 7/48; H02M 7/487; H02M 7/501; H02M 7/4826; H02M 7/497;
(Continued)

(56) References Cited

U.S. PATENT DOCUMENTS 5,870,292 A   2/1999 Lipo et al.
8,626,084 B2 * 1/2014 Chan ..................... H03F 1/347
                                                        455/78
(Continued)

FOREIGN PATENT DOCUMENTS

CN        203219198 U    9/2013
CN        205004960 U    1/2016
WO     WO-2009/008742 A1 1/2009

OTHER PUBLICATIONS

International Search Report dated Sep. 1, 2017 issued in International Application No. PCT/CN2016/109910.
(Continued)

*Primary Examiner* — Bryan R Perez
(74) *Attorney, Agent, or Firm* — Saliwanchik, Lloyd & Eisenschenk

(57) ABSTRACT

A system and a control method for generating multiple independent alternating current (AC) voltages from a direct current (DC) voltage source in a single-inductor multiple-output (SIMO) inverter are disclosed. The system comprising: a DC voltage source (101) for providing electrical energy; a front-stage DC-DC power converter (105) comprising exactly one inductor as an energy storage element for power conversion and a main switching element; a plurality of selectable output branches (106), wherein each output branch comprises an output selection switch (107), a resonant tank (110), and a transmitter coil (109), wherein the resonant tank converts output power of the DC-DC power converter into AC power for feeding the transmitter coil; and (Continued)

a controller (104) for determining ON/OFF states of the main switching element and the output selection switch of each of the output branches. The system and the method can provide simple, compact, scalable, and low-cost solutions by employing only a single inductor to drive multiple independent transmitting coils.

21 Claims, 14 Drawing Sheets

(51) Int. Cl.
*H02J 7/02* (2016.01)
*H02M 1/00* (2006.01)
*H02J 50/12* (2016.01)

(58) Field of Classification Search
CPC ...... H02M 7/49; H02M 7/4807; H02M 7/537; H02M 7/5387; H02M 7/53; H02M 7/533; H02M 3/156; H02M 3/158; H02M 3/1588; H02M 3/155; H02M 3/1582; H02M 3/157; H02M 3/1563; H02M 3/1584; H02M 1/32; H02M 1/081–084; H02M 2003/1566; H02M 2003/1557; H02M 2001/0012; H02M 2001/0009; H02M 2001/385; H04B 2215/069
USPC ..... 363/97, 98, 131, 132, 65, 71, 72, 35–37, 363/135, 136, 137, 40, 41, 43, 55, 95; 323/271, 280–285
See application file for complete search history.

(56) References Cited

U.S. PATENT DOCUMENTS

| | | | |
|---|---|---|---|
| 8,629,650 | B2 | 1/2014 | Mohammadian et al. |
| 9,306,401 | B2 | 4/2016 | Lee et al. |
| 2005/0270812 | A1 | 12/2005 | Vinciarelli |
| 2010/0135045 | A1* | 6/2010 | Inoue .................... H02M 3/337 363/17 |
| 2013/0154508 | A1* | 6/2013 | Gilliom ................. H02M 3/158 315/297 |
| 2014/0217998 | A1* | 8/2014 | Krueger .................... G05F 1/46 323/273 |
| 2015/0102793 | A1* | 4/2015 | Chen ................... H02M 3/1588 323/282 |

OTHER PUBLICATIONS

Johari, R. et al., "Analysis and Practical Considerations in Implementing Multiple Transmitters for Wireless Power Transfer via Coupled Magnetic Resonance", *IEEE Transactions on Industrial Electronics*, Apr. 2014, 61(4):1774-1783, IEEE.
Nguyen, M.Q. et al., "Multiple-Inputs and Multiple-Outputs Wireless Power Combining and Delivering Systems", *IEEE Transactions on Power Electronics*, Nov. 2015, 30(11):6254-6263, IEEE.
Waters, B.H. et al., "Power Delivery and Leakage Field Control Using an Adaptive Phased Array Wireless Power System", *IEEE Transactions on Power Electronics*, Nov. 2015, 30(11):6298-6309, IEEE.
Shi, L. et al., "Wireless Power Hotspot that Charges All of Your Devices", *2015 Annual International Conference on Mobile Computing (ACM MobiCom 2015)*, Sep. 7-11, 2015, Paris, France, pp. 2-13, ACM.
"Coils Used for Wireless Charging", Document Number: AN4866, Freescale Semiconductor, Inc., Application Note, 2014, webpage <http://cache.freescale.com/files/microcontrollers/doc/app_note/AN4866.pdf>.
"MWCT1200DS", Document Number: MWCT1200DS, Freescale Semiconductor, Data Sheet, Freescale Semiconductor, Inc., 2015, webpage <http://cache.nxp.com/files/microcontrollers/doc/data_sheet/MWCT1200DS.pdf?fpsp=1&WT_TYPE=Data%20Sheets&WT_VENDOR=FREESCALE&WT_FILE_FORMAT=pdf&WT_ASSET=Documentation&fileExt=.pdf>.
"WCT1001A/WCT1003A Automotive A13 Wireless Charging Application User's Guide", Document Number: WCT100XAWCAUG, Freescale Semiconductor, User's Guide, Freescale Semiconductor, Inc., 2014, webpage <http://cache.nxp.com/files/microcontrollers/doc/user_guide/WCT100XAWCAUG.pdf>.
Yao, Z. et at., "A Novel Multiple Output Grid-Connected Inverter Based on DSP Control", *Proc. IEEE Power Electron. Spec. Conf.*, Jun. 2008, pp. 317-322, IEEE.
Kumari, V. et al., "Comparative Study of Multiple-output Series Resonant Inverters for IH Applications", *2015 International Conference on Circuit, Power and Computing Technologies* [ICCPCT], Mar. 2015, 7 pages.
Lucía, O. et al., "Multiple-Output Resonant Matrix Converter for Multiple-Inductive-Load Systems", *Proc. IEEE Power Electron. Spec. Conf.*, Mar. 2011, pp. 1338-1343, IEEE.
Lucía, O. et al., "Multiple-Output Resonant Matrix Converter for Multiple Induction Heaters", *IEEE Transactions on Industry Applications*, Jul./Aug. 2012, 48(4):1387-1396, IEEE.
Lucía, O. et al., "Multiple-Output Resonant Inverter Topology for Multi-Inductor Loads", *Proc. IEEE Appl. Power Electron. Conf.*, Feb. 2010, pp. 1328-1333, IEEE.
Hirokawa, T. et al., "Dual-Frequency Multiple-Output Resonant Soft-Switching Inverter for Induction Heating Cooking Appliances", *39th Annual Conference of the IEEE Industrial Electronics Society (IECON 2013)*, Nov. 2013, pp. 5028-5033.
Sarnago, H. et al., "Multiple-Output Boost Resonant Inverter for High Efficiency and Cost-Effective Induction Heating Applications", *Proc. IEEE Appl. Power Electron. Conf.*, Mar. 2016, pp. 1040-1044, IEEE.
"The Qi Wireless Power Transfer System Power Class 0 Specification", Part 4: Reference Designs, Version 1.2.2, Apr. 2016, Wireless Power Consortium.
"Qi Compliant Wireless Power Transmitter Manager", Check for Samples: Bq500210, Texas Instruments, Jun. 2011—Revised Sep. 2012, Texas Instruments Incorporated, webpage <http://www.ti.com/lit/ds/slusal8c/slusal8c.pdf>.

* cited by examiner

| Power Stage of the proposed SIMO inverter | Total number of switches |
|---|---|
| Buck | $N + 2$ |
| Boost | $N + 1$ |
| Buck-boost | $N + 3$ |

US 10,903,756 B2

SINGLE-STAGE SINGLE-INDUCTOR MULTIPLE-OUTPUT (SIMO) INVERTER TOPOLOGY WITH PRECISE AND INDEPENDENT AMPLITUDE CONTROL FOR EACH AC OUTPUT

CROSS-REFERENCE TO RELATED APPLICATION

This application is the U.S. national stage application of International Patent Application No. PCT/CN2016/109910, filed Dec. 14, 2016, the disclosure of which is incorporated herein by reference in its entirety.

FIELD OF INVENTION

The present disclosure relates to DC-AC power supply topologies for powering up multiple AC loads simultaneously, and more particularly, for driving multiple transmitting coils for wireless power transfer (WPT).

BACKGROUND

In wireless power transfer (WPT) systems, the coil of each transmitter is excited by specific settings, such as voltage, phase, frequency and current, to generate a magnetic field so that good transmission efficiency can be achieved. Conventionally, each setting requires one power supply to drive the WPT circuit. Some existing power supplies use multiple power converters to drive multiple transmitting coils in a WPT system, but they are comparatively large in size and not energy efficient. Therefore, the cost of using multiple sets of transmitter and receiver is very high.

In a conventional multi-coil transmitter architecture, multiple power converters—one for each transmitting coil—are employed to beam-form the magnetic field to receivers for performing wireless power transfer. The power transfer of the system is achieved essentially through magnetic induction between the transmitting coil and the receiving coil. Typically, the power stage of each transmitter comprises a full-bridge inverter and a parallel LCL resonant network. The full-bridge inverter is powered from a DC source and delivers energy to the electromagnetic filed generated by the matching inductor, resonant capacitor, and the primary transmitting coil. A major drawback of this conventional topology is that the number of power inverters is directly proportional to the number of transmitting coils, such that as the number of transmitting coils increases, the number of inverters increases, leading to a high number of components, a larger form factor, and increased cost, especially as the number of transmitting antennae increases.

More recently, a three-stage power conversion architecture has been proposed for driving multiple transmitting coils. It consists of three individual stages, namely a DC-AC converter (inverter), a power de-multiplexer, and an array of transmitting coils. The front-stage DC-AC converter transforms a DC input into an AC output, and it is typically implemented as a full-bridge inverter. The middle-stage power de-multiplexer enables one or more resonant generation circuits to be connected to the front-stage DC-AC converter. The final stage has the resonant generation circuit with the transmitting coil being operated as a primary coil for magnetic induction. A major drawback of this power conversion topology is that the implementation of the power de-multiplexer requires a plurality of power switches. The total number of discrete power switches increases as the number of transmit coils increases, and this leads to larger size and greater cost for the overall system. It also increases the power loss, thereby reducing the power efficiency. Moreover, the complexity of the control scheme in such a three-stage topology also scales with the number of transmit coils. It requires two sets of controllers—one for the front-stage DC-AC converter and the other for the power de-multiplexer—which further complicates the controller design.

BRIEF SUMMARY

Due to the aforementioned limitations of wireless power transfer (WPT) systems, there is a need in the art for a new power supply topology for multi-coil wireless power transmission that is compact, scalable, cost-effective, highly efficient, and easy to implement.

Embodiments of the subject invention provide novel and advantageous systems, methods, and topologies for generating multiple alternating current (AC) power sources from a common direct current (DC) power supply simultaneously. Such systems, methods, and topologies can be compact, scalable, cost-effective, highly efficient, and easy to implement. Each AC power source can independently provide energy to a transmitting coil in an inductively-coupled WPT system. To achieve this objective, embodiments of the subject invention provide single-stage DC-AC single-inductor multiple-output (SIMO) inverter topologies. Such a topology can include a frontend DC-DC converter with only one inductor for energy storage and a plurality of selectable output branches, each of which can comprise an output selection switch, an LC resonant tank, and a transmitter coil. The resonant tank, which can be an integral part of the power stage of the DC-AC SIMO inverter, can transform the input DC power into an AC power for feeding the transmitting coil. In many embodiments, a single controller can be used to determine the ON/OFF states for the main switching element of the DC-DC converter as well as the switching elements of the output branches. Each individual output branch can use a voltage sensor, which can be in the form of for example a peak voltage detector, to provide a voltage signal for control purposes. A current sensor, which can measure the current pulses in the inductor of the DC-DC power converter, can also be present to provide the control signals for the system.

In an embodiment, a system for generating multiple independent AC voltages from a DC voltage source in a SIMO inverter can comprise: a DC voltage source for providing electrical energy; a front-stage DC-DC power converter comprising an inductor (e.g., exactly one inductor) as an energy storage element for power conversion; a plurality of selectable output branches, wherein each output branch comprises an output selection switch, a resonant tank, and a transmitter coil, wherein the resonant tank converts input DC power into an AC power for feeding the transmitter coil; and a controller for determining ON/OFF states of a main switching element of the DC-DC power converter and switching elements of the output branches. The system can further comprise: output branch sensors for the output branches for providing feedback control signals to the controller; and a current sensor sensing current of the inductor of the DC-DC power converter to provide main control signals for the system.

Compared with the conventional power supply topology for WPT, single-stage SIMO inverters of embodiments of the subject invention offer simple, compact, scalable, and low-cost solutions by employing only a single inductor to drive multiple independent transmitting coils.

DETAILED DESCRIPTION

Embodiments of the subject invention provide novel and advantageous systems, methods, and topologies for generating multiple alternating current (AC) power sources from a common direct current (DC) power supply simultaneously. Such systems, methods, and topologies can be compact, scalable, cost-effective, highly efficient, and easy to implement. Each AC power source can independently provide energy to a transmitting coil in an inductively-coupled wireless power transfer (WPT) system. To achieve this objective, embodiments of the subject invention provide single-stage DC-AC single-inductor multiple-output (SIMO) inverter topologies. Such a topology can include a frontend DC-DC converter with only one inductor for energy storage and a plurality of selectable output branches, each of which can comprise an output selection switch, an LC resonant tank, and a transmitter coil. The resonant tank, which can be an integral part of the power stage of the DC-AC SIMO inverter, can transform the input DC power into an AC power for feeding the transmitting coil. In many embodiments, a single controller can be used to determine the ON/OFF states for the main switching element of the DC-DC converter as well as the switching elements of the output branches. Each individual output branch can use a voltage sensor, which can be in the form of for example a peak voltage detector, to provide a voltage signal for control purposes. A current sensor, which can measure the current pulses in the inductor of the DC-DC power converter, can also be present to provide the control signals for the system.

Figure 1:
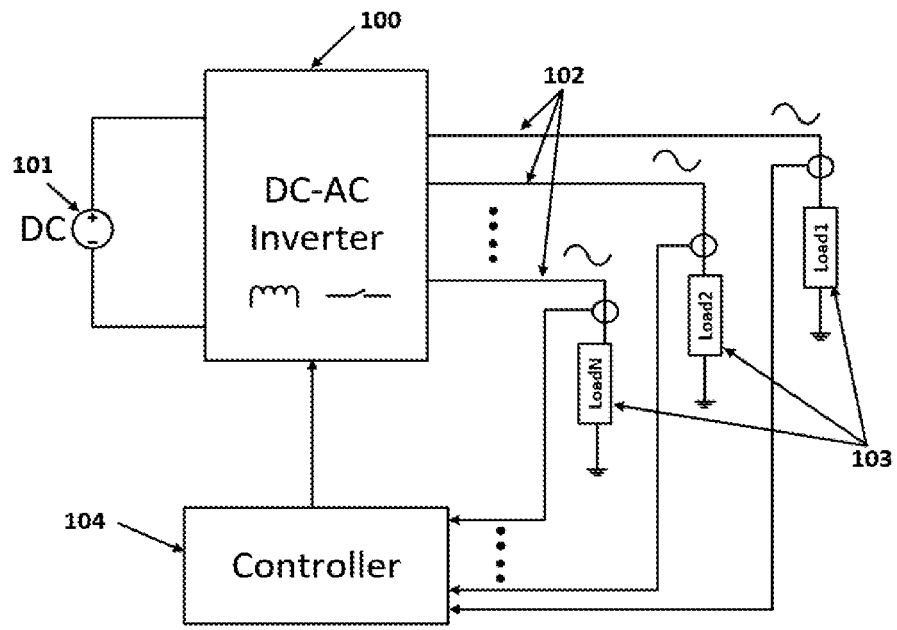
FIG. 1 shows a block diagram of a single-stage direct current alternative current (DC-AC) single-inductor multiple-output (SIMO) inverter system according to an embodiment of the subject invention.
Figure 2:
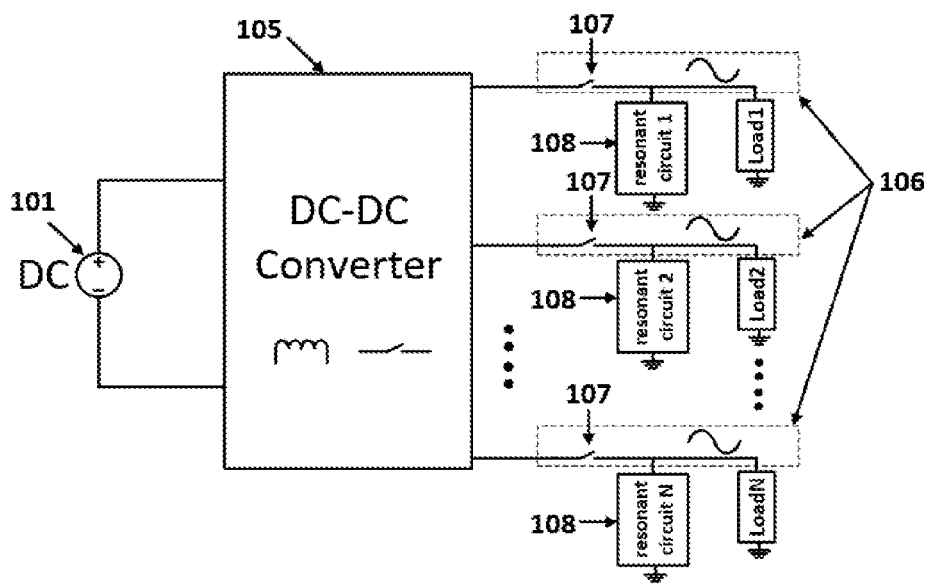
FIG. 2 is a block diagram of a single-stage DC-AC SIMO inverter system according to an embodiment of the subject invention, comprising a frontend DC-DC power converter and a plurality of DC-AC output branches each having a resonant circuit and an AC load.

FIG. 1 shows a block diagram of a single-stage DC-AC SIMO inverter system according to an embodiment of the subject invention. Referring to FIG. 1, a closed loop system can comprise an DC-AC inverter 100 for transforming a DC power supply 101 into a plurality of AC power sources 102, a plurality of AC loads 103, and a controller 104 for regulating the output power. Referring to FIG. 2, in an embodiment, the DC-AC inverter 100 can comprise a front-end DC-DC power converter 105 and multiple DC-AC output branches with AC voltage outputs 106. The front-end DC-DC power converter 105 may include only one inductor for power conversion, and it can act as a current source for feeding the multiple output branches in a time-multiplexing fashion. Each output branch can be selected by its corresponding switch 107, and its resonant circuit 108 can transform the input current source into an AC power source.

Figures 3, 4:
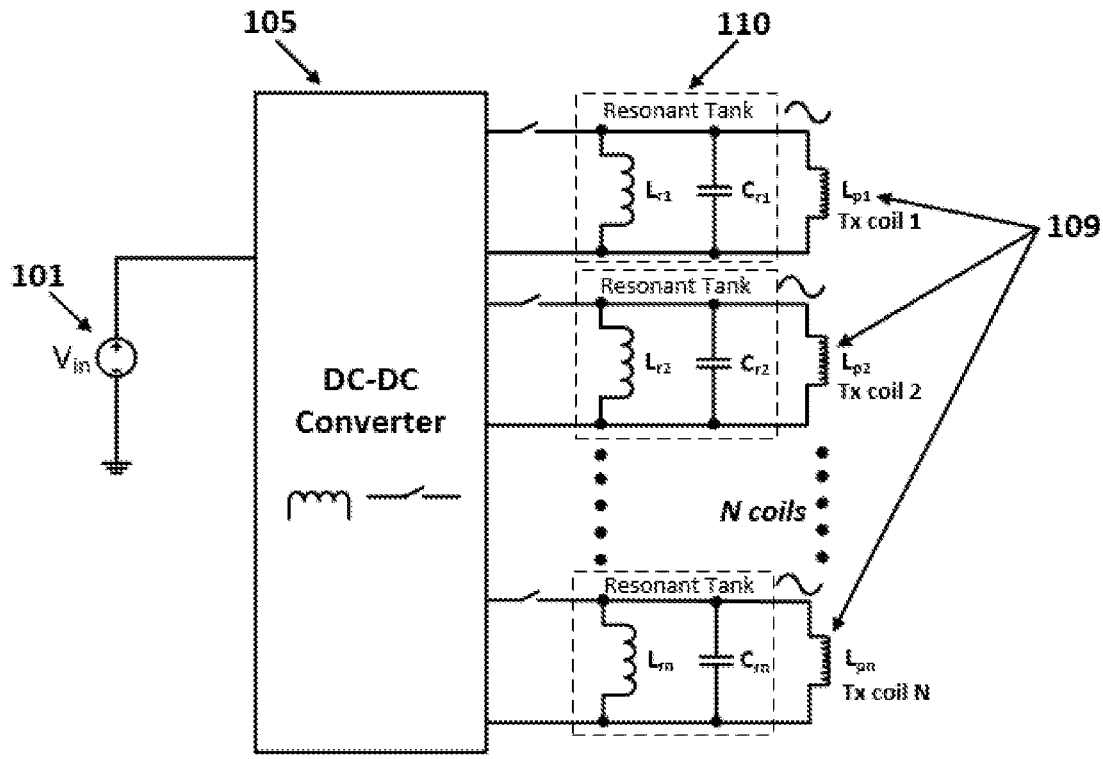
FIG. 3 is a block diagram of a single-stage DC-AC SIMO inverter system according to an embodiment of the subject invention, which acts as a wireless power transmitter for wireless power transfer applications.
FIG. 4 is a table showing the total number of switches required for various types of power stages of an inverter according to an embodiment of the subject invention.

FIG. 3 shows a functional block diagram of a single-stage DC-AC SIMO inverter system according to an embodiment of the subject invention. Referring to FIG. 3, the system can drive a plurality of independent transmit antennae (or transmit foils) 109 simultaneously for WPT applications. As shown in FIG. 3, the major functional blocks can include a common SIMO DC-DC converter 105 and a plurality of parallel inductive-capacitive (LC) resonant tanks 110, which can be in turn connected to their corresponding transmit coils 109. Only one inductor is used in the common DC-DC converter 105. The DC-DC converter 105, which can be configured as buck, boost, or buck-boost, can operate in Discontinuous Conduction Mode (DCM), in which the inductor current returns to zero at the end of every switching cycle. Each of the independently-driven outputs of the SIMO DC-DC converter can be connected to an LC resonant circuit 110, which comprises a parallel combination of an inductor and a capacitor. The voltage of each LC resonant tank 110 can be fed to its corresponding transmit coil 109. Wireless power can be transferred from the transmit coil through magnetic coupling or magnetic resonance to the receiver coil of a compatible load placed close to the transmit coil. Because the resonant inductor is connected in parallel with the transmitter coil 109, the inductance of the resonant inductor should be much smaller than that of the transmitter coil so the resonant frequency of the resonant tank 110 will not be changed significantly even if the transmit coil 109 is loaded with a nearby receiver coil with a load. Effectively, the LC resonant tank 110 can act like a high-frequency AC power source powering the transmit coil 109 (and its corresponding receiver load). Energy can be periodically transferred from the power stage of the SIMO DC-DC converter 105 into each of the resonant circuits 110 in a sequential fashion. The SIMO DC-DC converter 105 can feed the current sequentially into a group of parallel resonant tanks 110. Each resonant tank can turn the DC current source into an AC power source at the resonant frequency (with sinusoidal AC output voltage and current within the resonant tank). The switching frequency of the SIMO DC-DC converter can be the same as the resonant frequency. Because the DC-DC converter 105 can operate in Discontinuous Conduction Mode (DCM), the parallel branches comprising the resonant tanks and their corresponding transmitter coil can be independently driven. Because there are small dead times between successive current pulses distributed to the parallel branches under the DCM, the control of each parallel branch can be fully decoupled from the other parallel branches in order to achieve minimal cross-interference. In summary, embodiments of the subject invention can transform a DC input into multiple sinusoidal AC outputs with the use of a shared inductor. Such a system can be referred to as an SIMO inverter.

The SIMO inverter topology according to embodiments of the subject invention offers simple, compact, scalable, and low-cost solutions for generating multiple AC outputs. Only a single-stage DC-AC power conversion is required to power multiple AC loads concurrently. Each additional load requires only one more power switch. Hence, the total number of power switches required is only (N−1) for the inverter with boost power stage. FIG. 4 tabulates the total number of power switches required for the SIMO inverter whose power stage can either be configured as, for example (but not limited to), buck, boost, or buck-boost. Compared with related art systems, the SIMO inverter topology requires a much smaller number of power switches and gate drivers for the same number of loads. Smaller size, lower cost, and higher efficiency can be achieved, especially when the number of AC loads becomes larger.

Figure 5:
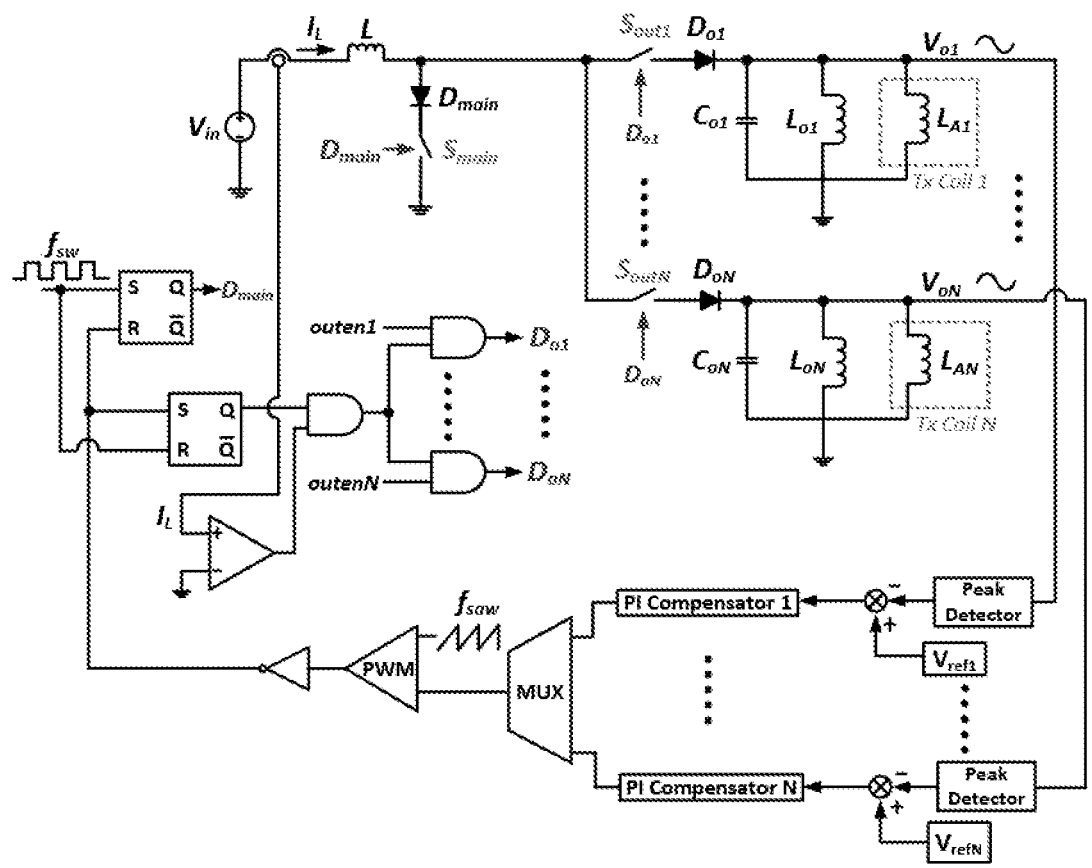
FIG. 5 shows a closed-loop system of an SIMO inverter with boost power stage according to an embodiment of the subject invention.

The operating principles of systems and control methods of embodiments of the subject invention will now be discussed. A boost converter is used as an example for illustrating the operating principles, although other types of converters such as buck and buck-boost converter (that also use one inductor) can also be used. FIG. 5 shows a closed-loop system of a "boost-converter based" SIMO inverter, according to an embodiment of the subject invention, with N independent AC outputs 111 and the controller 112. The control method includes N distinct outer voltage loops (for controlling the main switch $S_{main}$ 113 of the DC-DC power converter) and one inner current loop (for controlling the N branch selection switches $S_{out1}$ 114a to $S_{outN}$ 114b). For illustrative purposes only, the power stage of the proposed SIMO inverter is configured as a boost converter. Without loss of generality, the outer voltage loop for the first output branch will be considered because the functionality of each outer loop is essentially the same. The main purpose of the outer loop is to control the on-time of the main switch $S_{main}$ 113 in the power stage, which determines the peak value of the output voltage. The outer loop uses the AC output voltage as a feedback signal. A peak detector circuit 115 can be used to extract the peak value of the sinusoidal output voltage, $V_{o,pk}$ of the resonant tank that supplies the AC voltage to the transmitter coil. This peak voltage can be compared against a pre-set peak voltage reference $V_{ref1}$ 116. The resulting error signal, i.e., the difference between $V_{o,pk}$ and $V_{ref1}$, is fed into the compensator such as a proportional-integral (PI) compensator 117. For the parallel branches, the voltage errors can be multiplexed one by one to the PWM modulator 118. The error can then be fed to the PWM modulator 118 to generate the PWM duty ratio for $S_{main}$ 113 using the trailing-edge modulation. As shown in FIG. 5, a set-reset (SR) latch 119 can be used to generate the gate drive signal of $S_{main}$ 113. $S_{main}$ 113 can be turned ON at the rising edge of the switching clock and it can be turned OFF at the rising edge of the PWM output.

Referring to FIG. 5, in order to minimize the number of hardware components, the outputs of all the PI compensators 117 can be time-multiplexed together before feeding them into a common PWM modulator 118. Hence, all the subsequent logic elements beyond the PI compensators 117 can be time-shared among all the SIMO outputs. While the control implementation described herein is based on a mixture of digital and analog circuits, it should be understood that other implementation methods, such as using fast programmable circuits (e.g., FPGA), can also be used to achieve the same or similar control functions. Unlike the outer voltage loops 120, there is only one inner current loop 121, which is shared by all the parallel output branches. The inner current loop 121 is primarily used to control the on-time of the output switches (i.e., branch selection switches $S_{out1}$ 114a to $S_{outN}$ 114b). For illustrative purposes only, the control of the first output switch $S_{out1}$ 114a is considered. The inner loop uses the inductor current $I_L$ 122 as a feedback signal to determine the closing of $S_{out1}$ 114a. As soon as $S_{main}$ 113 is switched OFF, $S_{out1}$ 114a is switched ON. $S_{out1}$ 114a remains ON until the zero-crossing of the inductor current 122 is detected, which indicates that the inductor has been fully discharged. After that, the SIMO inverter enters into the idle state in DCM during which the inductor current stays at zero. Upon the arrival of the rising edge of the switching clock, $S_{main}$ 113 is switched ON again, which commences the switching cycle for the next output branch. It is important to note that the energy flowing into each of the AC output loads can be independently adjusted by simply assigning a unique peak voltage reference to each output. Due to the nature of the time-multiplexing control scheme, the SIMO inverter can be effectively modeled as an array of sub-inverters because only one of the AC output loads is connected to the power stage of the SIMO inverter at any point in time. The resonant inductance 123 in the resonant tank is assumed to be much smaller than the inductance of the transmitter coil 124. This assumption allows the resonant frequency of the resonant tank to remain stable even if the transmitter coil is loaded. The switching frequency of the SIMO inverter is determined by the resonant frequency of the output load which is dependent on the values of $L_{oi}$ and $C_{oi}$, where the index i denotes the $i^{th}$ output. Mathematically, it can be represented as follows.

$$f_{sw} = f_o = \frac{1}{2\pi\sqrt{L_{oi}C_{oi}}} \qquad (1)$$

where $f_{sw}$ is the switching frequency and $f_o$ is the resonant frequency.

For example, the operating frequency of the Qi wireless power standard ranges between 110 kHz and 205 kHz. If a system according to an embodiment of the subject invention is used to conform to the Qi standard, the switching frequency (or resonant frequency) of the SIMO inverter can fall within this frequency range. Of course, a frequency that suits other international standards can also be chosen. For a chosen resonant frequency, the appropriate values of $L_o$ and $C_o$ can be determined.

Figure 6:
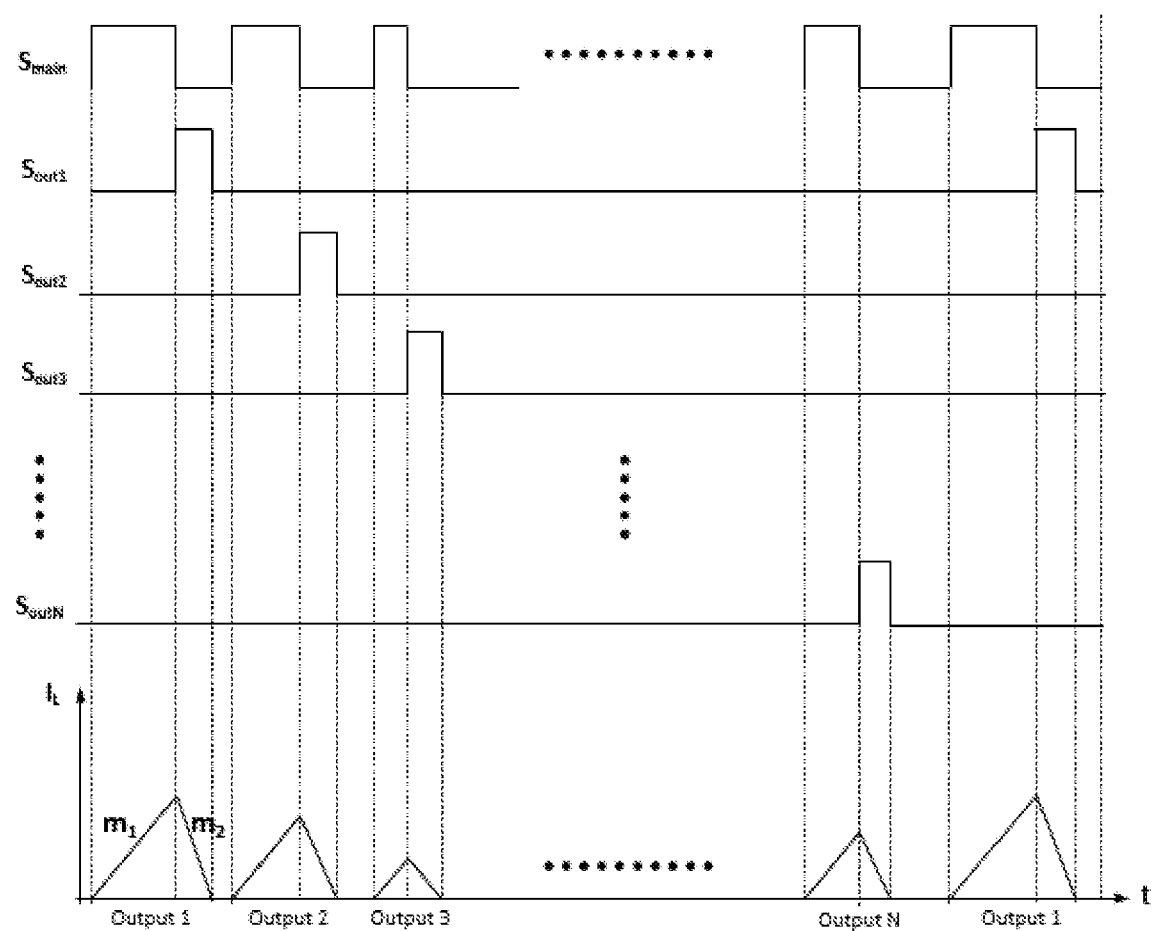
FIG. 6 shows a plot of the timing relationship for the main switch, output switches, and the inductor current for the SIMO inverter with boost power stage of FIG. 5.

Assuming that the power stage of the SIMO inverter is configured as a boost converter for illustrative purposes only, the switching sequence of all the SIMO switches, namely the main power switch and the output switches, is explained as follows. FIG. 6 shows the timing relationship for the main power switch ($S_{main}$) 113, the output switches ($S_{out1}$ 114a, ..., $S_{outN}$ 114b), and the inductor current ($I_L$) 122. The feedback control based on a controller, such as a PI compensator, can be primarily used to regulate the peak voltage in each of the individual AC outputs. In other words, it can control the amount of energy that can be transferred from the inductor in the power stage to each AC load in a round-robin fashion. At the beginning of each switching cycle, the main switch $S_{main}$ 113 is turned ON at the rising edge of the switching clock. During the first sub-interval of DCM, $S_{main}$ 113 is turned ON and all the output switches (114a, 114b) are turned OFF. The inductor current 122 ramps up with a positive slope of $m_1 = V_{in}/L$ 125. At the end of the first sub-interval, the inductor current reaches its peak value $I_{L,pk}$, which is represented as follows.

$$I_{L,pk} = m_1 D_1 T_s = \left(\frac{V_{in}}{L}\right) D_1 T_s \qquad (2)$$

Once the inductor current attains the peak value given by Equation (2), $S_{main}$ is turned OFF and one of the output switches is turned ON (while the remaining output switches are OFF). This marks the beginning of the second sub-interval in DCM. The inductor current then ramps down with a negative slope of $m_2 = [V_{in} - V_o(t)]/L$ 126, where $V_o(t)$ represents the instantaneous value of the sinusoidal output voltage. Because the SIMO inverter operates as a boost converter in this case, $V_{in} < V_o(t)$ during the second sub-interval. Hence, $m_2$ 126 is negative. The output switch remains ON until the zero-crossing of the inductor current is detected. At the end of the second sub-interval, the inductor is fully discharged and the output switch is turned OFF under zero-current condition. The SIMO inverter then enters the third sub-interval ("idle phase") in which all the switches are turned OFF and the inductor current remains at zero until the arrival of the next rising edge of the switching clock. The aforementioned switching sequence then repeats itself for every switching cycle. The main idea is that the time-shared inductor delivers the required energy into each individual AC load in a round-robin fashion.

The down-slope of the inductor current 126 actually varies with the instantaneous value of the sinusoidal output voltage because the output voltage can be decoupled into a DC (average) component and an AC component. For the sake of simplicity, first-order approximation can be applied by considering only the DC component of the output voltage during the second sub-interval. As a result, the down-slope of the inductor current can be represented as a straight line, as depicted in FIG. 6, which can be mathematically written as follows.

$$m_2 = \frac{V_{in} - \overline{V}_o}{L} \qquad (3)$$

where $\overline{V}_o$ denotes the average output voltage during the second sub-interval.

FIG. 6 depicts the general case of unbalanced AC loads, i.e., different power levels are delivered from the power stage to every output. The average inductor current going into each output load is different, which is characterized by the distinct peak values of the inductor current across the outputs, as shown in FIG. 6.

Soft switching can be used in the output switches to mitigate the switching loss and reduce the generation of electromagnetic interference (EMI). As an example, at the end of the second sub-interval when the inductor current, i.e., the current across the output diode $D_{o1}$, returns to zero, the output switch $S_{out1}$ can be turned OFF with zero-current switching (ZCS). The same soft switching technique can also be applied to other output switches.

Figure 7:
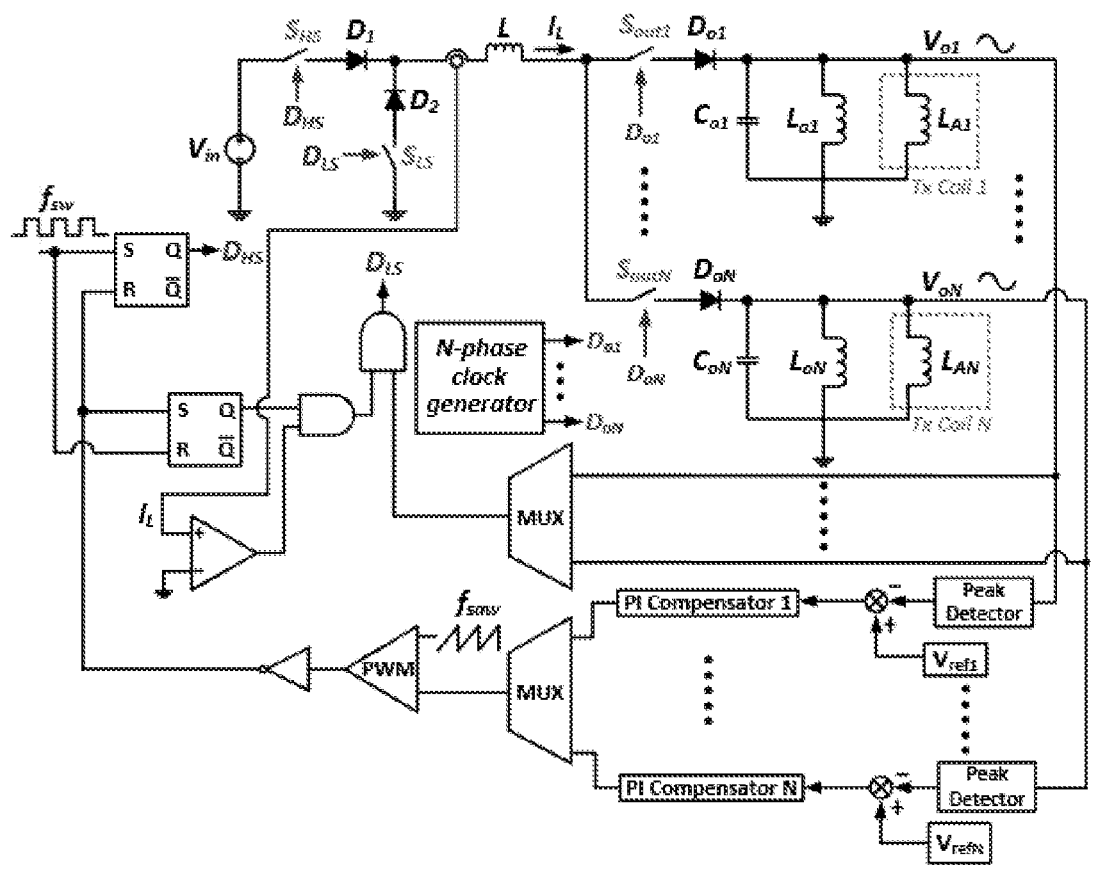
FIG. 7 shows the closed-loop system of an SIMO inverter with buck power stage according to an embodiment of the subject invention.
Figure 8:
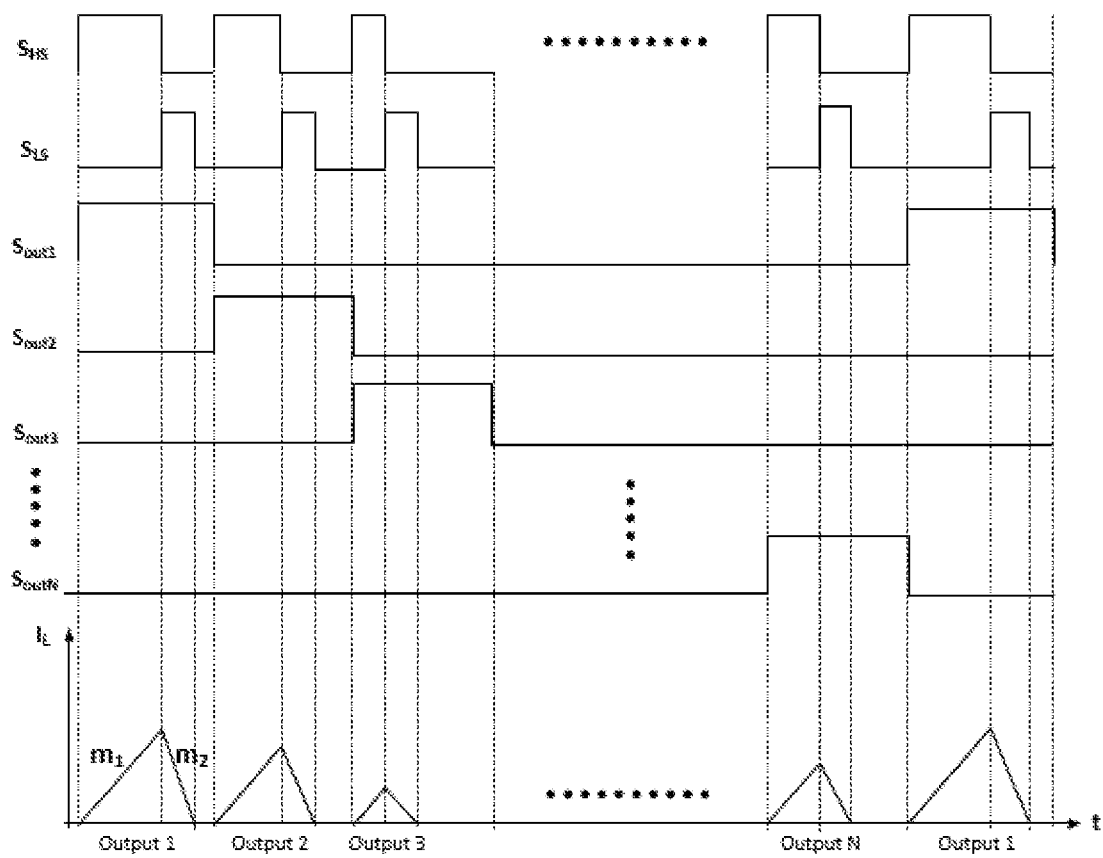
FIG. 8 shows a plot of the timing relationship for the main switch, output switches, and the inductor current for the SIMO inverter with buck power stage of FIG. 7.

The switching sequence of an SIMO inverter with the power stage configured as a buck converter, according to an embodiment of the subject invention, will now be discussed. FIG. 7 shows the closed-loop system for such an SIMO inverter with a buck power stage. There are two power switches, namely $S_{HS}$ 127 and $S_{LS}$ 128, in the power stage and N output switches ($S_{out1}$ 129a, ..., $S_{outN}$ 129b) in the output stage. Hence, a total of (N+2) switches are required in this particular SIMO inverter topology. FIG. 8 depicts the corresponding timing relationship for the high-side and low-side power switches ($S_{HS}$ 127, $S_{LS}$ 128), the output switches ($S_{out1}$ 129a, ..., $S_{outN}$ 129b), and the inductor current ($I_L$) 130. At the beginning of each switching cycle, the high-side switch $S_{HS}$ 127 and one of the output switches (e.g. $S_{out1}$ 129a) are turned ON at the rising edge of the switching clock. During the first sub-interval of DCM, $S_{HS}$ 127 remains ON and the inductor current 130 ramps up with a positive slope of $m_1 = (V_{in} - V_{out})/L$ 131. At the end of the first sub-interval, the inductor current 130 reaches its peak value $I_{L,pk}$ which can be expressed as:

$$I_{L,pk} = m_1 D_1 T_s = \left(\frac{V_{in} - V_{out}}{L}\right) D_1 T_s \qquad (4)$$

Once the inductor current 130 reaches its peak value given by Equation (4), $S_{HS}$ 127 is turned OFF and then the low-side switch $S_{LS}$ 128 is turned ON. This marks the beginning of the second sub-interval in DCM. The inductor current 130 ramps down with a slope of $m_2 = V_o(t)/L$ 132, where $V_o(t)$ represents the instantaneous value of the sinusoidal output voltage. $S_{LS}$ 128 remains ON until either the zero-crossing of the inductor current or the zero-crossing of the output voltage is detected. At the end of the second sub-interval, the inductor is fully discharged and $S_{LS}$ 128 is turned OFF under zero-current condition. The SIMO inverter then enters the third sub-interval ("idle phase") in DCM where the inductor current 130 remains at zero until the arrival of the next rising edge of the switching clock. The output switch (e.g. $S_{out1}$ 129a) remains ON for the full switching cycle. The switching sequence then repeats itself in the following switching cycle for another output.

Figure 9:
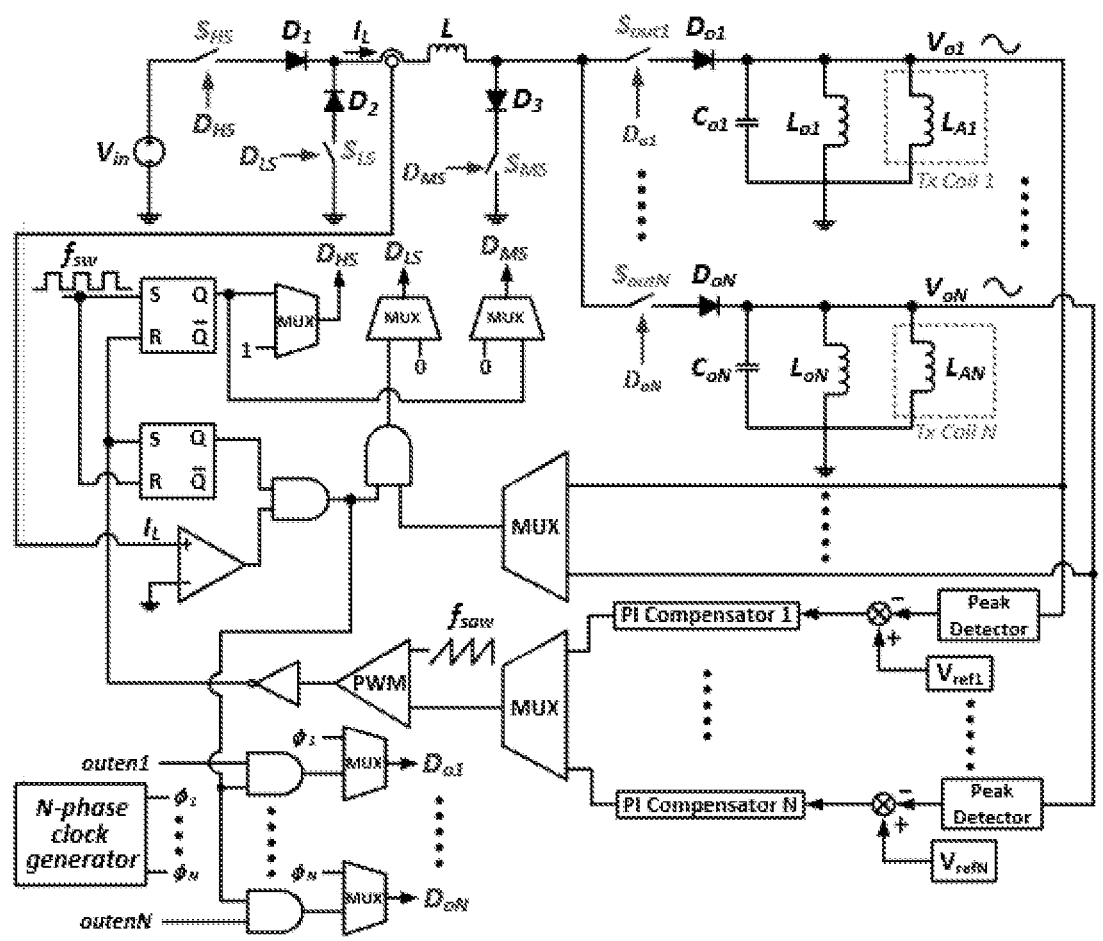
FIG. 9 shows the closed-loop system of an SIMO inverter with buck-boost power stage according to an embodiment of the subject invention.

In an embodiment, the power stage of the SIMO inverter topology can be configured as buck-boost. FIG. 9 shows the closed-loop system for an SIMO inverter with buck-boost power stage. In this topology, there can be three power switches, namely $S_{HS}$ 133, $S_{LS}$ 134, and $S_{MS}$ 135, in the power stage and N output switches ($S_{out1}$ 136a, . . . , $S_{outN}$ 136b) in the output stage. Hence, a total of (N+3) switches is required. When this buck-boost SIMO inverter operates in the buck mode, $S_{MS}$ 135 is always turned OFF and the power stage essentially becomes the same as that shown in FIG. 7. The corresponding timing diagram between the power switches ($S_{HS}$, 133, $S_{LS}$ 134), the output switches ($S_{out1}$ 136a, . . . , $S_{outN}$ 136b) and the inductor current ($I_L$) 137 is identical to that shown in FIG. 8. Likewise, when the buck-boost SIMO inverter operates in the boost mode, $S_{HS}$ 133 is always turned ON and $S_{LS}$ 134 is always turned OFF. Hence, the effective power stage becomes identical to that shown in FIG. 5. The corresponding timing diagram between the power switch ($S_{MS}$) 135, the output switches ($S_{out1}$ 136a, . . . , $S_{outN}$ 136b), and the inductor current ($I_L$) 137 is essentially identical to that shown in FIG. 6.

An important requirement of the SIMO inverter according to many embodiments of the subject invention is that it must operate in DCM. This means that the inductor current always returns to zero at the end of every switching cycle. The inductor current is fed to each individual AC output in a time-multiplexed fashion. The use of this time-multiplexing control scheme with multiple energizing phases means that the outputs are fully decoupled in time. In other words, a load change in one output will not induce an unwanted change in another output. Hence, it results in negligible cross-regulation across the outputs.

Figure 10:
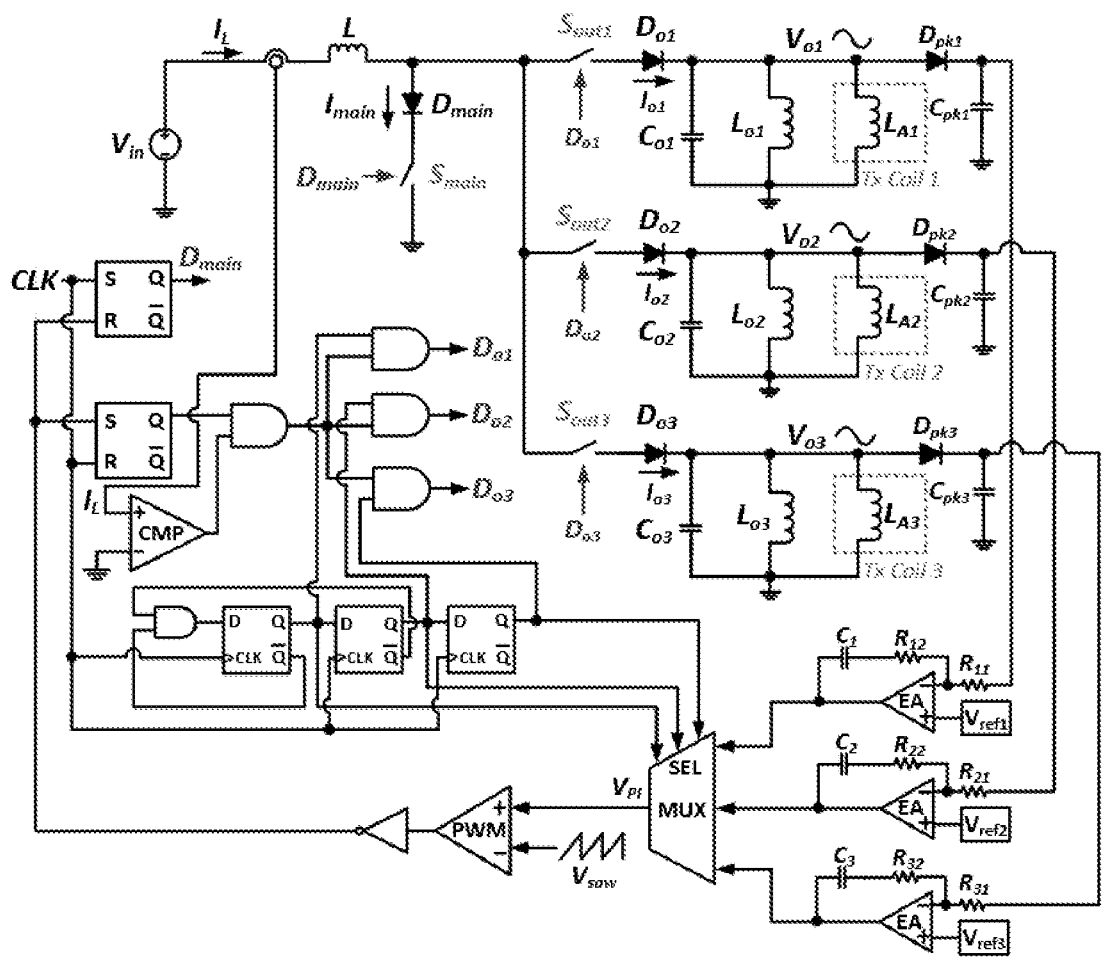
FIG. 10 shows the circuit topology of a single-stage single-inductor three-output (SITO) inverter according to an embodiment of the subject invention.

By way of example only, operating modes of an SIMO inverter will be discussed using a single-inductor three-output (SITO) inverter as an example, as shown in FIG. 10. Referring to FIG. 10, there are a total of four switches (i.e., N+1, where N=3), namely one main switch $S_{main}$ 138 and three output switches, namely $S_{out1}$ 139, $S_{out2}$ 140, and $S_{out3}$ 141. L is the main inductor 142, and $S_{main}$ is the power MOSFET 138. $D_{main}$ is the main diode 143, which blocks the reverse current flow from ground to the output via the body diode of $S_{main}$ 144 when the output switch is turned ON and the output voltage goes negative. $D_{oi}$ is the branch diode 145 in the $i^{th}$ output for blocking the opposite current flow (i.e., from output to input via the body diode of $S_{outi}$ 146) when the instantaneous output voltage becomes larger than the input voltage. In other words, $D_{oi}$ 145 and the corresponding body diode of the output switch 146 form a pair of back-to-back diodes, which reinforces a unidirectional current flow from the inductor to the resonant tank. In order to reduce the conduction loss across these discrete diodes, Schottky diodes with very low forward voltage drop and very fast switching action can be used to help boost the power efficiency. The AC load can include a resonant tank, which includes a parallel combination of $C_{oi}$, $L_{oi}$, and $R_{oi}$ in series with the transmit antenna coil $L_{Ai}$. $V_{in}$ is the DC input voltage of the SITO inverter. $V_{o1}$, $V_{o2}$ and $V_{o3}$ are the three individual AC output voltages. $I_L$ is the inductor current, and $I_{o1}$, $I_{o2}$ and $I_{o3}$ are the output currents that flow through the corresponding output switches.

Figure 11A:
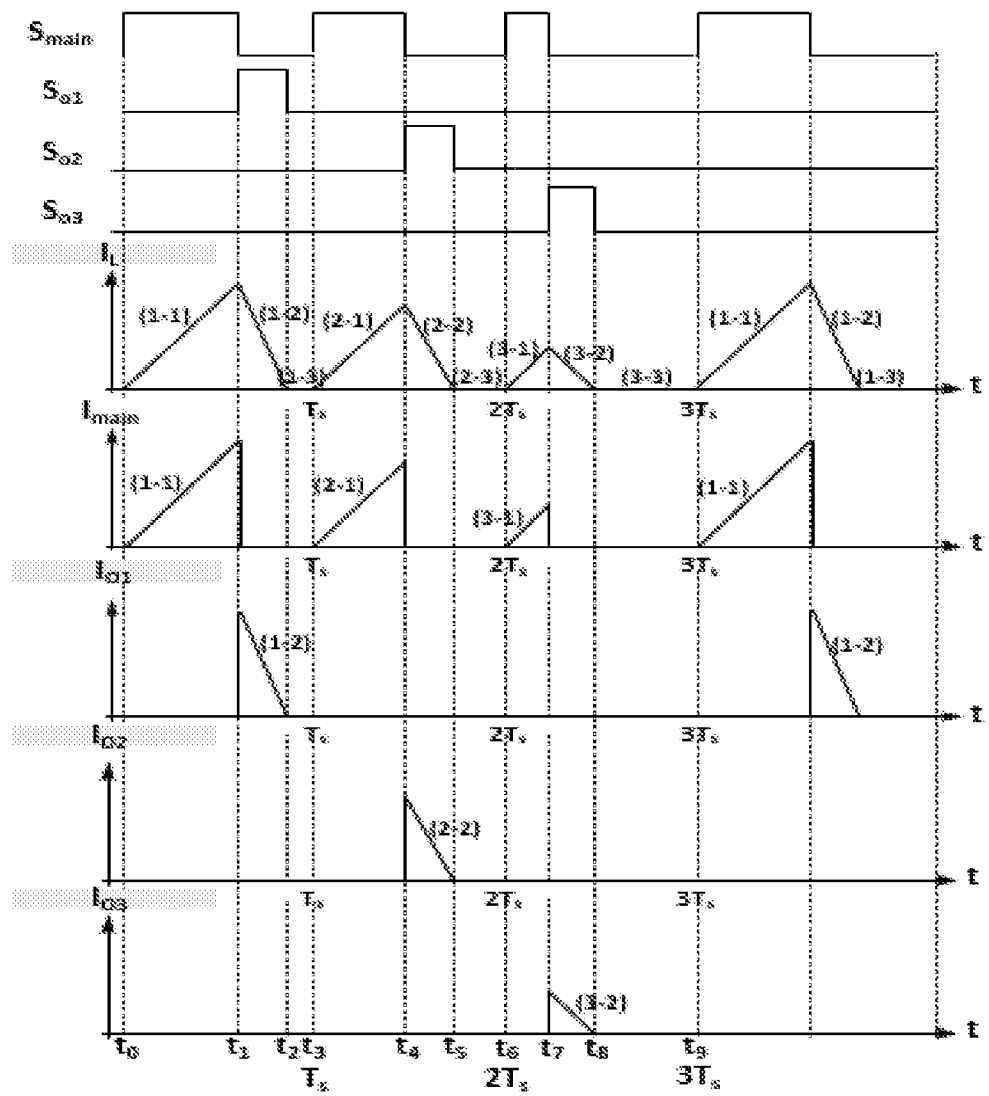
FIG. 11A shows a plot of the ideal timing diagram for the main switch, output switches, inductor current, the current through the main switch and the output switches, and the corresponding switching sequence of an SIMO inverter according to an embodiment of the subject invention.
Figure 11B:
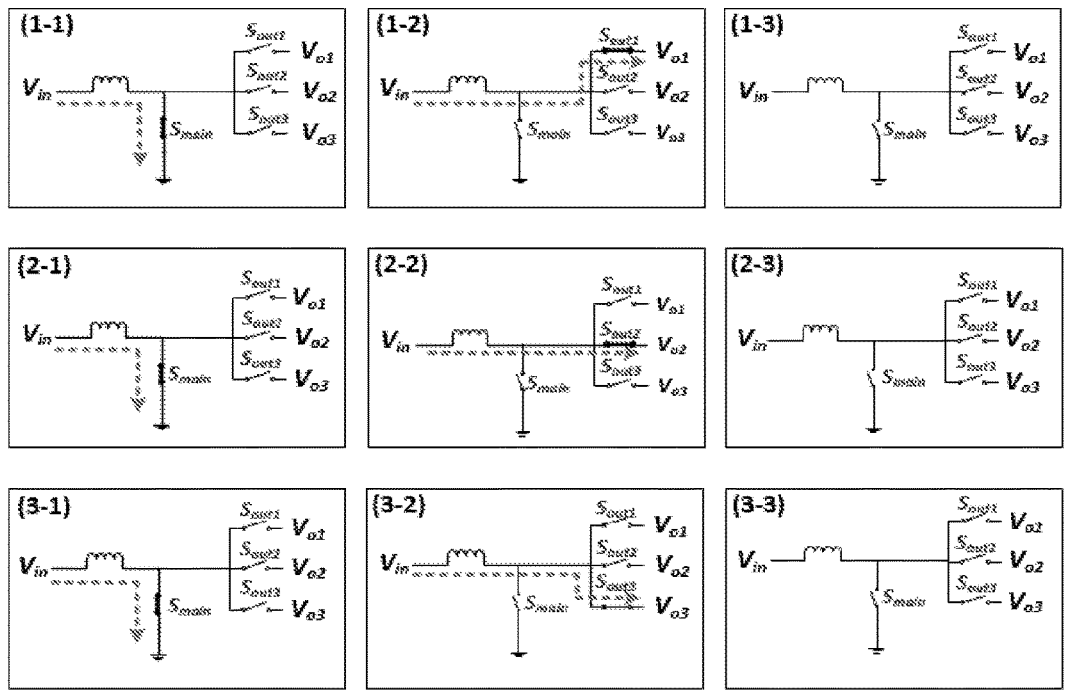
FIG. 11B shows the corresponding switching sequence of the SIMO inverter for which the plot is shown in FIG. 11A.

FIG. 11A shows ideal waveforms of all the switches, namely $S_{main}$ 138, $S_{out1}$ 139, $S_{out2}$ 140, and $S_{out3}$ 141, the inductor current ($I_L$), and the current across the switches ($I_{main}$, $I_{o1}$, $I_{o2}$, $I_{o3}$), where $T_s$ denotes the switching period for the main switch $S_{main}$. Referring to FIG. 11A, the SITO inverter operates in DCM where the inductor current $I_L$ always returns to zero value at the end of every switching cycle. FIG. 11B shows the corresponding switching sequence of the SITO inverter.

There are three distinct modes of operation per output during one switching period $T_s$, which can be categorized as follows (the first output is used as an example).

Mode 1 ($t_0$-$t_1$): The main switch $S_{main}$ 138 is ON, and all the output switches are OFF. The inductor current $I_L$ ramps up at a constant rate of $V_{in}$/L. Mode 1 for the first output is annotated as (1-1) in FIGS. 11A and 11B. Likewise, Mode 1 for the second and third outputs are annotated as (2-1) and (3-1), respectively.

Mode 2 ($t_1$-$t_2$): The main switch $S_{main}$ 138 is OFF, and the first output switch $S_{out1}$ 139 is ON while the other two output switches are OFF. The inductor current $I_L$ ramps down at a rate of ($V^{in}$-$V_{out}$)/L until $I_L$ drops to zero which marks the end of Mode 2. Mode 2 for the first output is annotated as (1-2) in FIGS. 11A and 11B. Likewise, Mode 2 for the second and third outputs are annotated as (2-2) and (3-2), respectively.

Mode 3 ($t_2$-$t_3$): All the switches are OFF. $I_L$ remains at zero during this idle period. Mode 3 for the first output is annotated as (1-3) in FIGS. 11A and 11B. Similarly, Mode 3 for the second and third outputs are annotated as (2-3) and (3-3), respectively.

The second and third outputs can follow the same switching sequence as the first output. The energy from the inductor can be distributed to the three outputs in a time-interleaving manner. The same switching sequence can be scaled conveniently to N outputs, where N is the total number of transmit coils.

Single-stage DC-AC SIMO inverters of embodiments of the subject invention make use of a single inductor to generate multiple independent sinusoidal output voltages. By varying the voltage reference in each output, the magnitude of each individual output voltage can be independently adjusted. Practical applications for the SIMO inverters are plentiful and include driving an array of transmit coils for WPT. Advantages of such inverters include, but are not limited to, smaller component count, lower material cost, simplified control scheme, ease of implementation, and higher power efficiency.

The subject invention includes, but is not limited to, the following exemplified embodiments.

Embodiment 1. A system for generating multiple independent alternating current (AC) voltages from a direct current (DC) voltage source in a single-inductor multiple-output (SIMO) inverter, the system comprising:

a DC voltage source for providing electrical energy;

a front-stage DC-DC power converter comprising exactly one inductor as an energy storage element for power conversion;

a plurality of selectable output branches, wherein each output branch comprises an output selection switch, a resonant tank, and a transmitter coil, wherein the resonant tank converts input DC power into an AC power for feeding the transmitter coil; and a controller for determining ON/OFF states of a main switching element of the DC-DC power converter and switching elements of the output branches.

Embodiment 2. The system according to embodiment 1, further comprising output branch sensors for the output branches for providing feedback control signals to the controller.

Embodiment 3. The system according to any of embodiments 1-2, further comprising a current sensor sensing current of the inductor of the DC-DC power converter to provide main control signals for the system.

Embodiment 4. The system according to embodiment 3, wherein the current sensor measures current pulses in the inductor of the DC-DC power converter.

Embodiment 5. The system according to any of embodiments 3-4, wherein the current sensor provides current pulse signals that are synchronized with the operating frequency and used to control switching states of the output selection switches, along with enable signals of logical circuits for the corresponding output branches.

Embodiment 6. The system according to any of embodiments 1-5, wherein the DC-DC power converter is a switched mode power electronic circuit.

Embodiment 7. The system according to embodiment 6, wherein the DC-DC power converter is a buck power converter, a boost power converter, a buck-boost power converter, or a derivative thereof.

Embodiment 8. The system according to any of embodiments 1-7, wherein each resonant tank comprises an inductor and a capacitor connected in parallel, and wherein AC voltage across the capacitor is fed to the transmitter coil.

Embodiment 9. The system according to any of embodiments 1-8, wherein each output branch comprises a voltage sensor to provide a voltage signal as a control signal.

Embodiment 10. The system according to embodiment 9, wherein each voltage sensor is a peak voltage detector.

Embodiment 11. The system according to embodiment 10, wherein the peak voltage detector comprises a diode and a capacitor connected to each other in series, and a resistor connected in parallel with the capacitor for determining a discharge time constant of the peak voltage detector, and wherein the voltage of the diode and the capacitor represents the peak voltage.

Embodiment 12. The system according to any of embodiments 1-11, wherein a voltage of each resonant tank voltage is sensed and compared with a reference voltage, and the voltage difference is then used to derive a duty cycle of the main switching element of the DC-DC power converter through a pulse-width-modulation (PWM) circuit.

Embodiment 13. The system according to embodiment 12, wherein the voltage difference is multiplexed and fed to the PWM circuit.

Embodiment 14. The system according to embodiment 12, wherein the voltage difference is proportional to the duty cycle of the main switching element of DC-DC power converter, and wherein the duty cycle of the main switching element is proportional to a peak current of the inductor of the DC-DC power converter.

Embodiment 15. The system according to embodiment 12, wherein an output voltage of each resonant tank is the peak voltage of the resonant tank.

Embodiment 16. The system according to any of embodiments 1-15, wherein current of the inductor of the DC-DC power converter is controlled by the main switching element in a discontinuous current mode (DCM) to provide a soft-switching condition for the main switching element and to reduce cross-interference in the control of the output branches.

Embodiment 17. The system according to embodiment 16, wherein current pulses of the inductor are directed to the output branches through the control of the output selection switches.

Embodiment 18. The system according to any of embodiments 1-17, wherein the output selection switches are controlled such that not more than one output selection switch can be turned on at any instant, and such that an input current of the inductor of the DC-DC power convertor is delivered to the output branches in sequence to provide electric power for the output branches.

Embodiment 19. The system according to any of embodiments 1-18, wherein the main switching element of the DC-DC power converter is switched at the resonant frequency of the resonant tanks.

Embodiment 20. The system according to any of embodiments 1-19, wherein the transmitter coils provide wireless power for one or more loads that have a receiver coil tuned at the resonant frequency of the resonant tanks.

Embodiment 21. The system according to embodiment 20, wherein the one or more loads comprise a portable electronics product with a compatible receiver coil, a heating utensil suitable for inductive cooking, or both.

Embodiment 22. The system according to any of embodiments 1-21, wherein, in each output branch, an inductance of the transmitter coil is larger than that of an inductor of the resonant tank, such that the resonant frequency of the resonant tank does not change significantly when the transmitter coil is loaded.

Embodiment 23. A control method for generating multiple independent AC voltages from a DC voltage source in a SIMO inverter using a system according to any of embodiments 3-22, the method comprising:

receiving, by the controller, the feedback control signals from the output branch sensors and the main control signals from the current sensor; and determining, by the controller, the ON/OFF states of the main switching element of the DC-DC power converter based on the main control signals from the current sensor; and determining, by the controller, the ON/OFF states of the switching elements of the output branches based on the feedback control signals from the output branch sensors.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

Time-domain simulations were conducted using PowerSim (PSIM) software. The simulations were run on an SIMO inverter as described herein, using the design specifications listed in Table 1.

Figure 12:
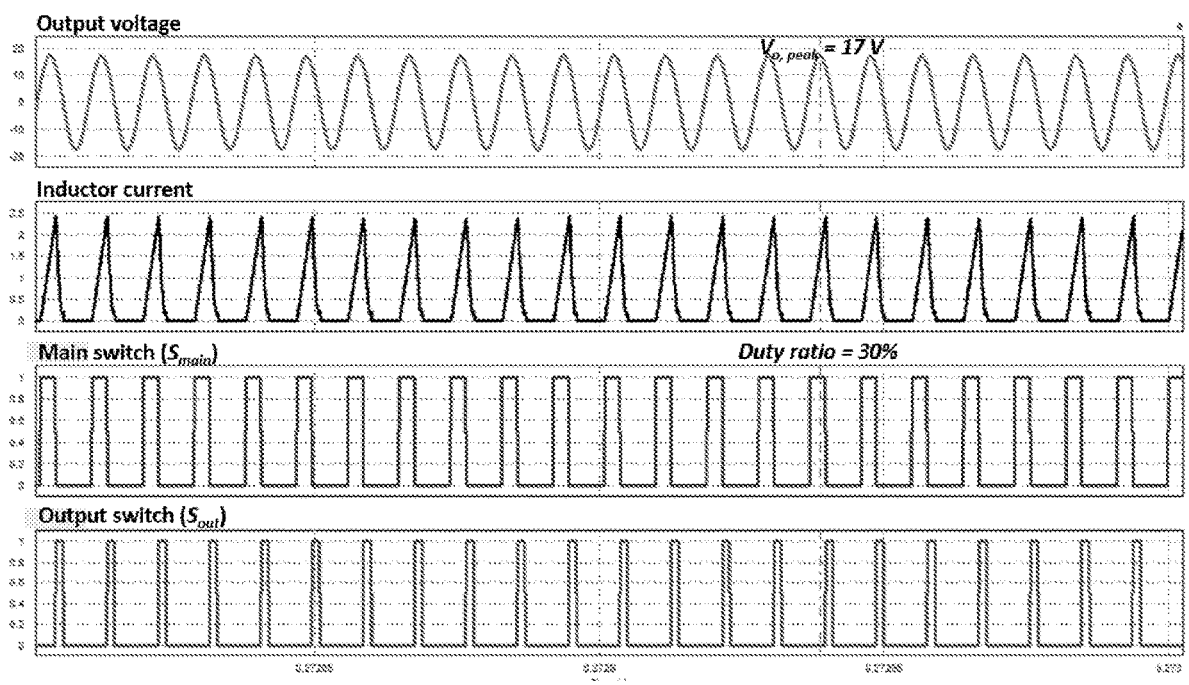
FIG. 12 shows simulated waveforms for a single-inductor single-output (SISO) inverter with a 30% duty ratio, according to an embodiment of the subject invention.

First, the basic functionality of a single-inductor single-output (SISO) inverter, which is a special case of the SIMO inverter, was investigated. For illustrative purposes, a switching frequency of 111 kHz was chosen, and that falls within the specified frequency range from the Qi standard (i.e., 110 kHz-205 kHz). Other frequency values within this range could also be used and investigated. FIG. 12 shows the simulated waveforms for the SISO inverter with a duty ratio of 30% for the main switch.

Figure 13A:
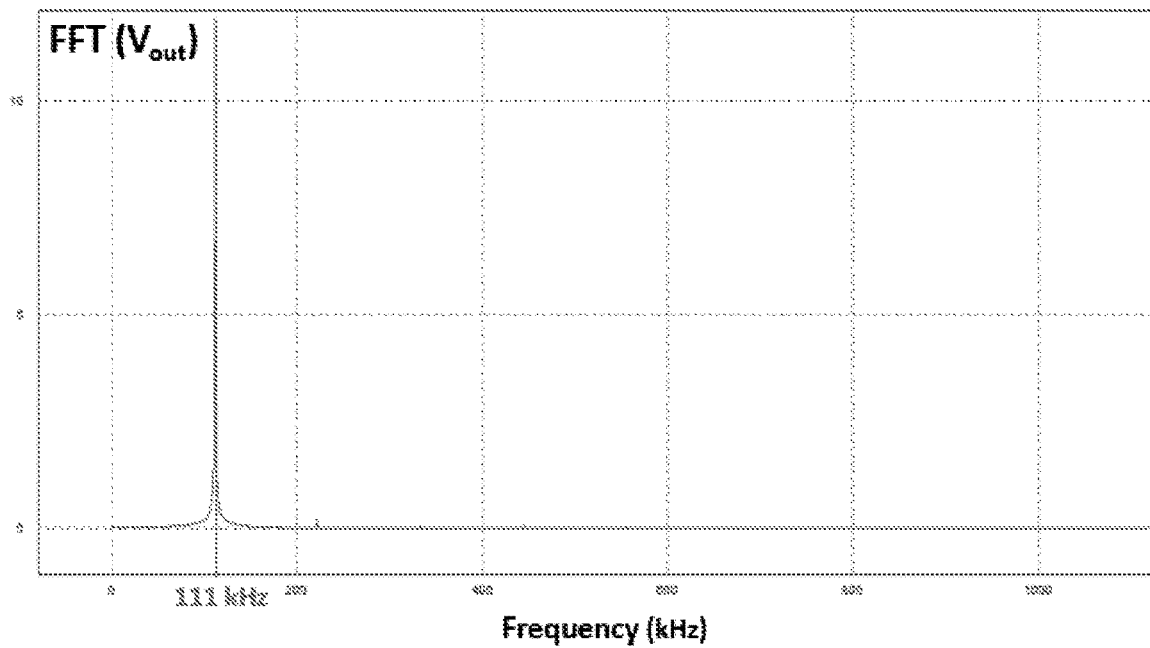
FIG. 13A shows a plot of the frequency spectrum of output voltage using Fast Fourier Transform (FFT).
Figure 13B:
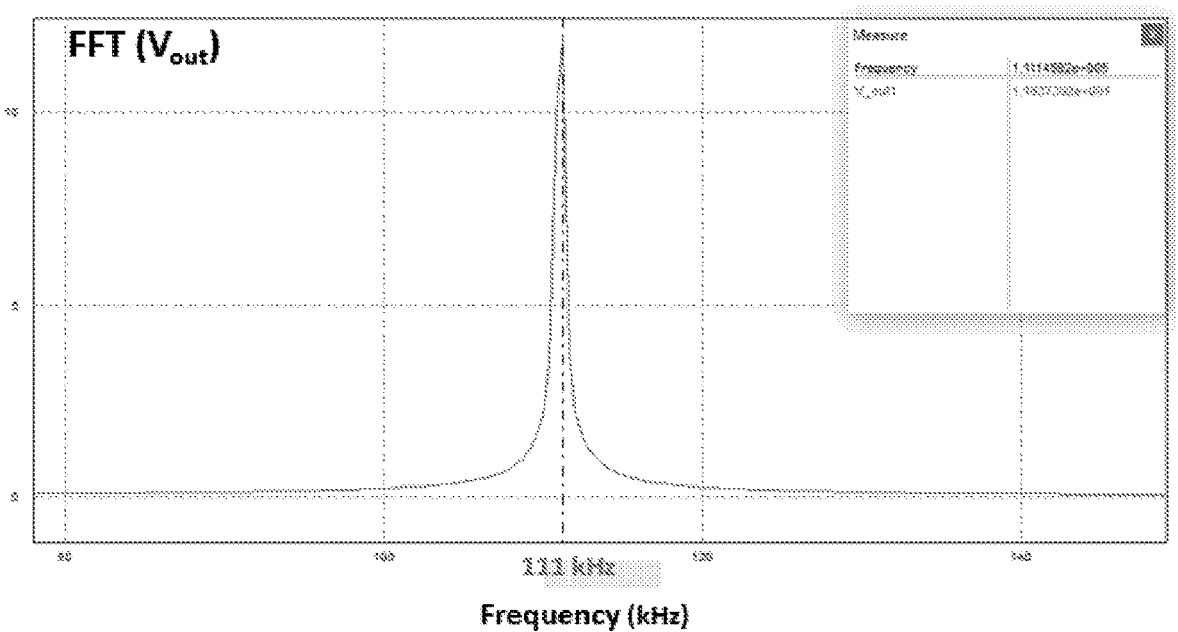
FIG. 13B shows an expanded view of the spectrum of FIG. 13A to show the fundamental frequency of 111 kHz.

Referring to FIG. 12, the output voltage of the SISO inverter is a sine wave with a frequency of 111 kHz and a peak amplitude of around 17 V. The duty ratio for the main switch was set at 30%. The fact that the inductor current returned to zero at the end of every switching cycle indicates that the SISO inverter operates in DCM. FIG. 13A shows the frequency spectrum of the output voltage using Fast Fourier Transform (FFT). It shows that the output voltage is a pure sine wave with a fundamental frequency of 111 kHz. No noticeable higher order harmonics were observed. FIG. 13B is an expanded view of FIG. 13A to highlight the fundamental frequency of the output voltage.

TABLE 1

Design specifications of the simulated SIMO inverter.

| Design Parameter | Value |
| --- | --- |
| Input voltage ($V_{in}$) | 3 V |
| Switching Frequency | 111 kHz |
| Main Inductor | 3 µF |
| Capacitor in the resonant tank | 1 µF |
| Inductor in the resonant tank | 2 µH |
| Inductance of the transmit coil | 100 µH |
| Resistor in the resonant tank | 50 Ω |
| Forward voltage drop ($V_F$) across the diode | 0.3 V |

Figure 14:
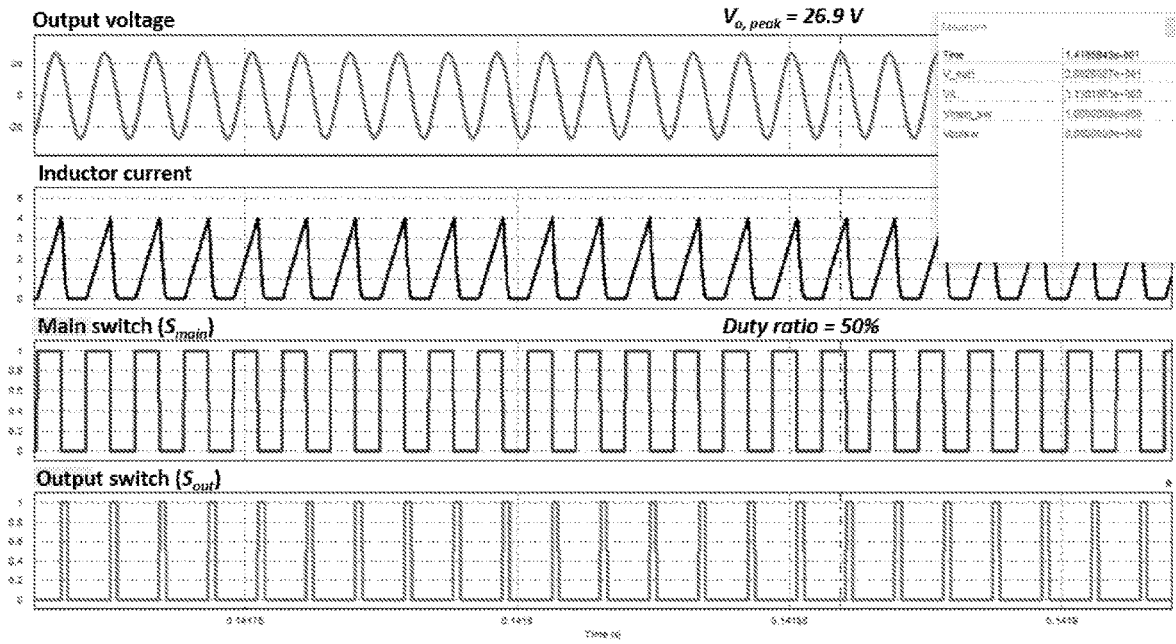
FIG. 14 shows simulated waveforms for an SISO inverter with a 50% duty ratio, according to an embodiment of the subject invention.

The duty ratio of the main switch $S_{main}$ can be used to adjust the peak value of the output voltage. FIG. 14 shows the simulated waveform of the SISO inverter with a duty ratio of 50%. By comparing FIG. 12 and FIG. 14, it can be seen that an increase in the duty ratio from 30% to 50% leads to a corresponding increase in the peak amplitude of the output voltage from 17 V to 26.9 V.

Figure 15:
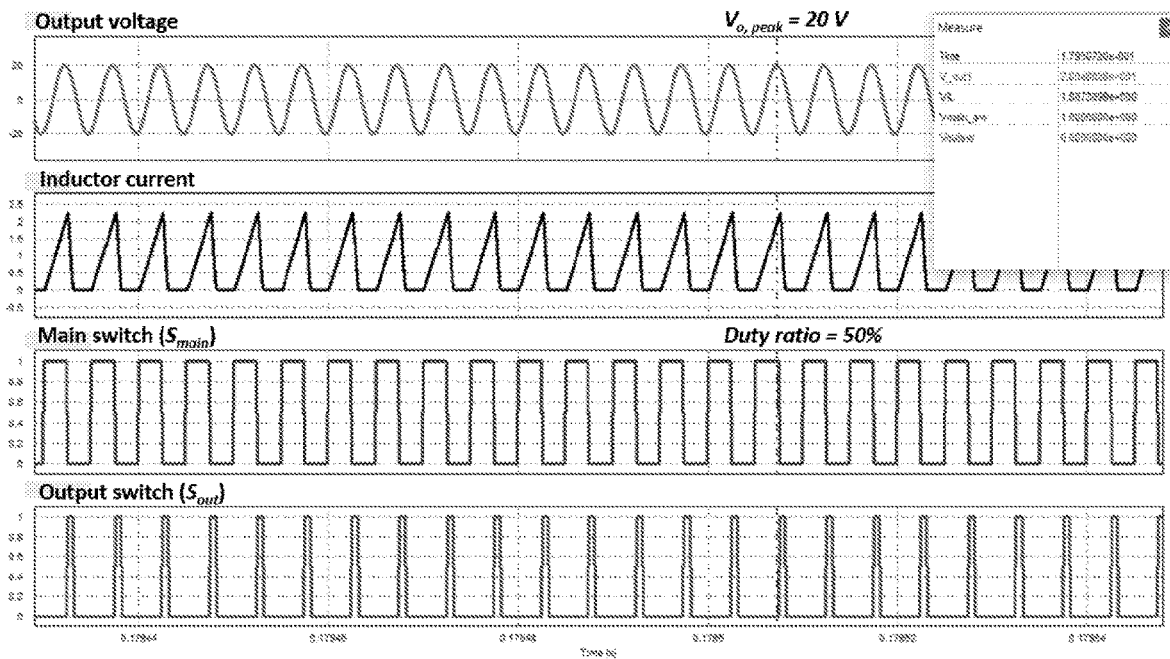
FIG. 15 shows simulated waveforms for an SISO inverter with a higher switching frequency of 200 kHz, according to an embodiment of the subject invention.
Figure 16:
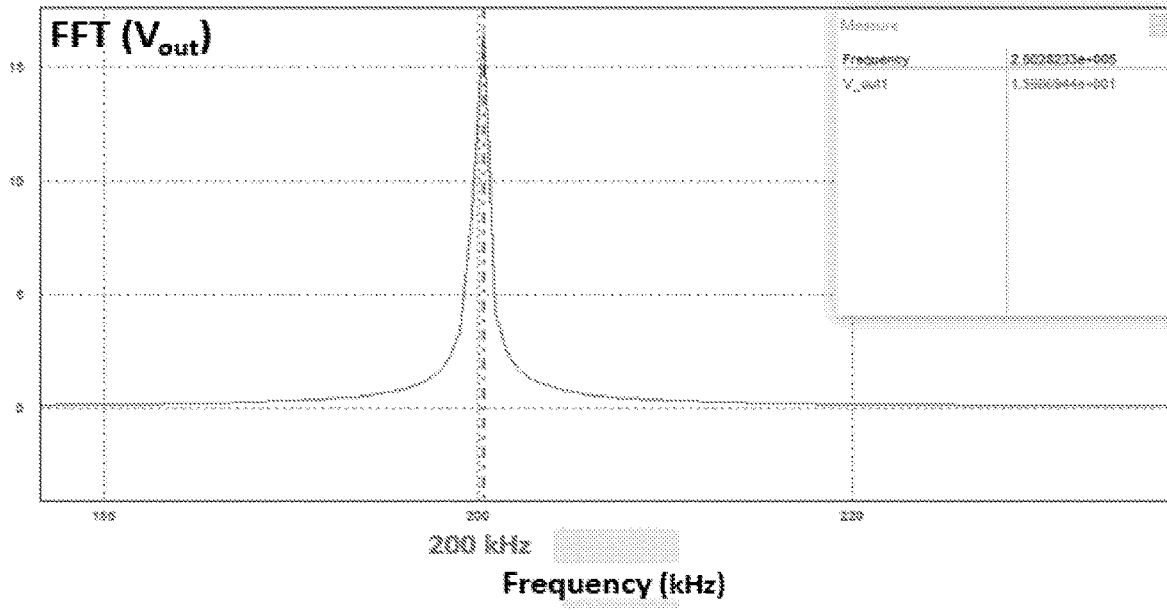
FIG. 16 shows an expanded view of the frequency spectrum of the output voltage using FFT to show the fundamental frequency of 200 kHz.

FIG. 15 shows that the SISO inverter continued to operate correctly when the switching frequency was increased to 200 kHz, which is very close to the upper frequency limit specified by the Qi standard [17][18]. According to Equation (1), a higher switching frequency implies that the values of the resonant inductor and capacitor need to be reduced accordingly. FIG. 16 shows the corresponding frequency spectrum of the output voltage using FFT. Referring to FIG. 16, the SISO inverter operated correctly with a higher switching frequency of 200 kHz.

Example 2

Time-domain simulations were conducted using PSIM software, as discussed in the first paragraph of Example 1. The design specifications listed in Table 1 were used. The functionality of a single-inductor three-output (SITO) inverter was investigated. First, a balanced load condition was investigated in which the three sinusoidal output voltages had the same frequency and magnitude.

Figure 17:
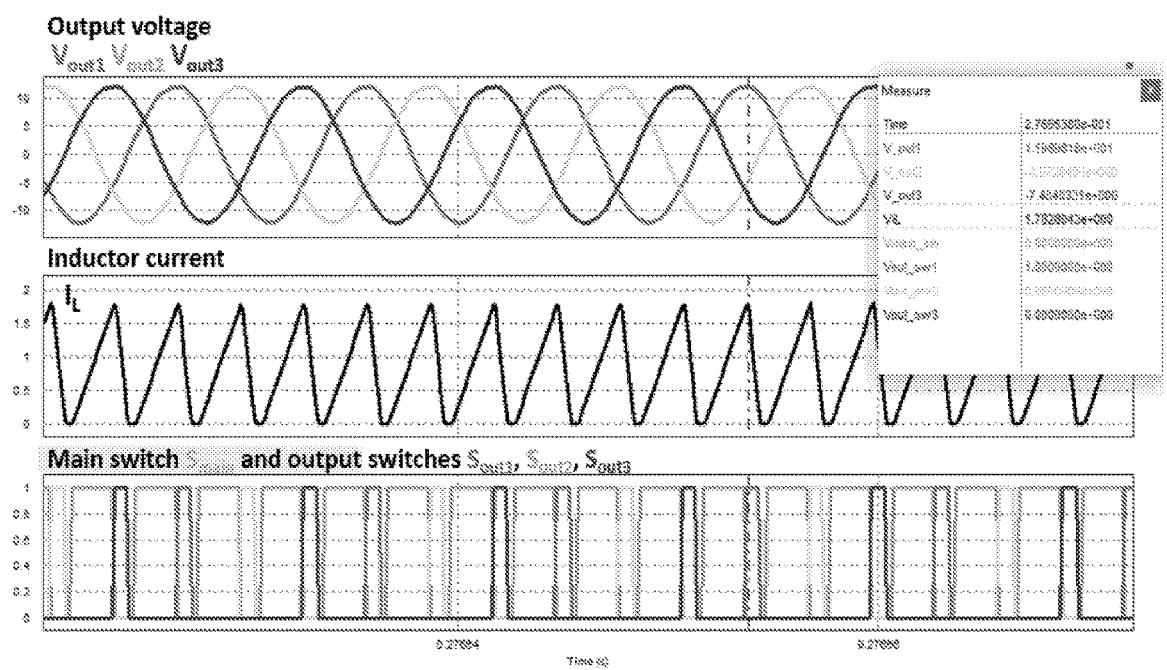
FIG. 17 shows simulated waveforms for an SITO inverter with three identical loads, according to an embodiment of the subject invention.

FIG. 17 shows the simulated waveforms for the SITO inverter with three identical loads. The amplitude of each of the three output voltages was around 12 V. The output frequency was 111 kHz, which is the same as the switching frequency. The phase difference between any two outputs was 120°. In general, for a SIMO inverter with N outputs, the phase difference between any two outputs is given by $2\pi/N$.

Example 3

Figure 18:
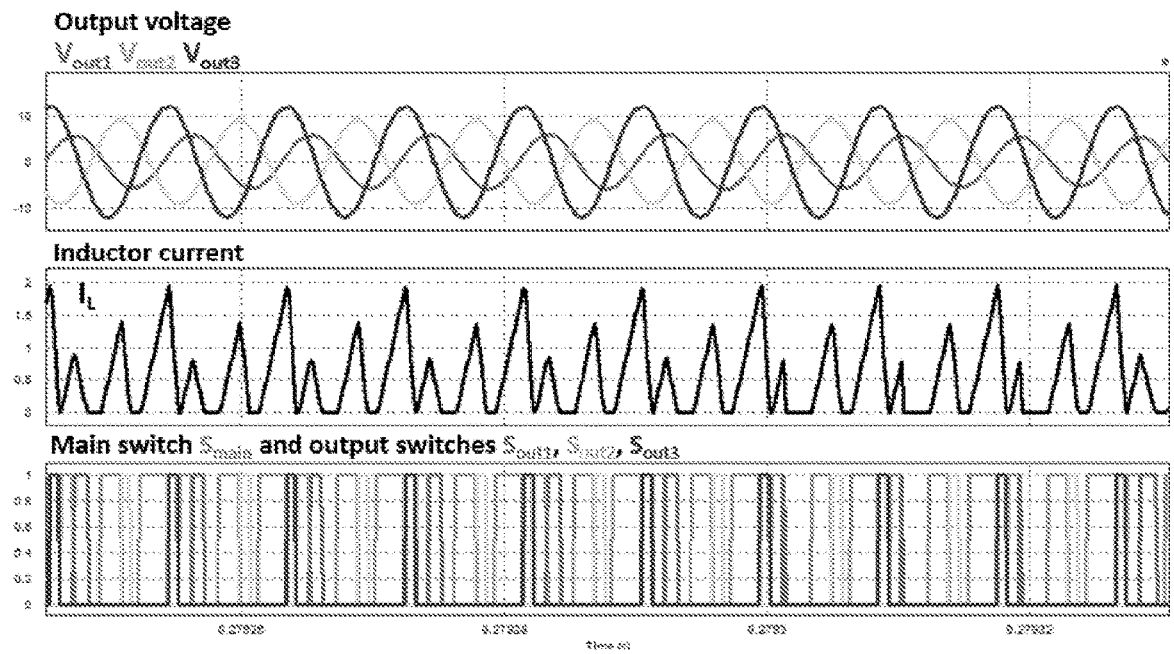
FIG. 18 shows simulated waveforms for an SITO inverter with three distinct loads, according to an embodiment of the subject invention.
Figure 19:
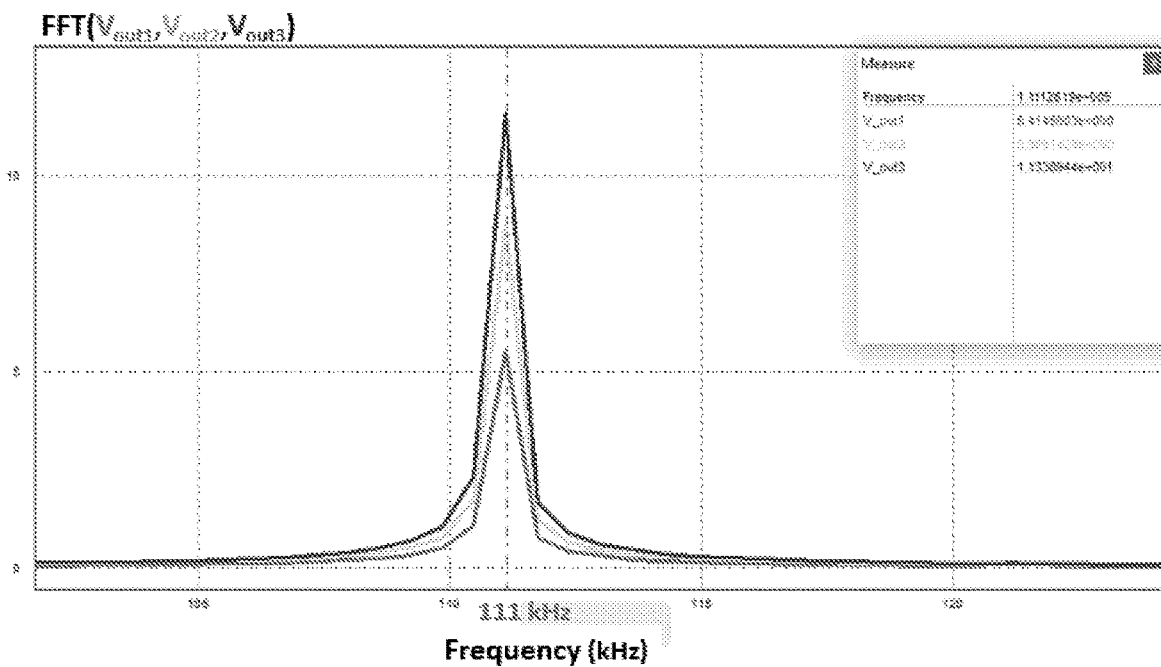
FIG. 19 shows a plot of the frequency spectrum of the three distinct output voltages in the SITO inverter for which simulated waveforms are shown in FIG. 18.

Example 2 was repeated, but using an unbalanced load condition in which the three sinusoidal output voltages had the same frequency but different amplitudes. FIG. 18 shows the simulated waveforms for the SITO inverter with three distinct loads. The voltage amplitudes for the first, second, and third outputs were 6 V, 9 V, and 12 V, respectively. Unlike Example 2, the inductor current exhibited distinct peak values for each of the three outputs in the unbalanced load scenario. FIG. 19 shows the corresponding FFT spectrum for the three sinusoidal outputs. Referring to FIG. 19, the three sinusoidal outputs had the same fundamental frequency of 111 kHz but different voltage levels.

The simulation results of Examples 1, 2, and 3 verify the functionality of the SIMO inverters of embodiments of the subject invention, which can use a single inductor to generate multiple independent AC voltages. Such an inverter can generate a high quality sine wave at each output with very low harmonics. The amplitude of each output voltage can be independently adjusted by varying the corresponding reference voltage in the closed-loop operation.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] R. Johari, J. V. Krogmeier, and D. J. Love, "Analysis and Practical Considerations in Implementing Multiple Transmitters for Wireless Power Transfer via Coupled Magnetic Resonance," *IEEE Trans. on Industrial Electronics*, vol. 61, no. 4, pp. 1774-1783, April 2014.

[2] M. Q. Nguyen, Y. Chou, D. Plesa, S. Rao, and J.-C. Chiao, "Multiple-Inputs and Multiple-Outputs Wireless Power Combining and Delivering Systems", *IEEE Trans. on Power Electronics*, vol. 30, no. 11, pp. 6254-6263, November 2015.

[3] Benjamin H. Waters, et al., "Power Delivery and Leakage Field Control Using an Adaptive Phased Array Wireless Power System", *IEEE Trans. on Power Electronics*, vol. 30, no. 11, pp. 6298-6309, November 2015.

[4] L. Shi, Z. Kabelac, D. Katabi, D. Perreault, "Wireless Power Hotspot that Charges All of Your Devices," 2015 *Annual International Conference on Mobile Computing (ACM MobiCom* 2015), pp. 2-13, September 2015.

[5] Application Note, "Coils Used for Wireless Charging," NXP Semiconductors, 2014, http://cache.freescale.com/files/microcontrollers/doc/app_note/AN4866.pdf

[6] J. Lee, et al., "Wireless Power Transmitter and Wireless Power Transfer Method Thereof in Many-To-One Communication," U.S. Pat. No. 9,306,401 B2.

[7] A. H. Mohammadian, et al, "Wireless Power Transfer Using Multiple Transmit Antennas", U.S. Pat. No. 8,629,650 B2.

[8] Datasheet: MWCT1200DS, "MWCT1200DS", NXP Semiconductors, 2015, http://cache.nxp.com/files/microcontrollers/doc/data_sheet/MWCT1200DS.pdf?fpsp=1&WT_TYPE=Data%20Sheets&WT_VENDOR=FREESCALE&WT_FILE_FORMAT=pdf&WT_ASSET=Documentation&fileExt=.pdf

[9] User's Guide: WCT1001A/WCT1003A, "WCT1001A/WCT1003A Automotive A13 Wireless Charging Application User's Guide", NXP Semiconductors. 2014, http://cache.nxp.com/files/microcontrollers/doc/user_guide/WCT100XAWCAUG.pdf

[10] Z. Yao, L. Xiao, Y. Yan, "A Novel Multiple Output Grid-Connected Inverter Based on DSP Control," in *Proc. IEEE Power Electron. Spec. Conf.*, pp. 317-322, June 2008.

[11] V. Kumari, D. V. Bhaskar, N. Parida, T. Maity, "Comparative Study of Multiple-Output Series Resonant Inverters for IH applications," 2015 *International Conference on Circuit, Power and Computing Technologies (ICCPCT)*, pp. 1-7, March 2015.

[12] O. Lucia, F. Almazan, J. Acero, J. M. Burdio, C. Carretero, "Multiple-Output Resonant Matrix Converter for Multiple-Inductive-Load Systems," in *Proc. IEEE Power Electron. Spec. Conf.*, pp. 1338-1343, March 2011.

[13] O. Lucia, C. Carretero, J. M. Burdio, J. Acero, and F. Almazan, "Multiple-Output Resonant Matrix Converter for Multiple Induction Heaters," *IEEE Trans. on Industry Applications*, vol. 48, no. 4, pp. 1387-1396, August 2012.

[14] O. Lucia, J. M. Burdio, I. Millan, and J. Acero, "Multiple-Output Resonant Inverter Topology for Multi-Inductor Loads," in *Proc. IEEE Appl. Power Electron. Conf.*, pp. 1328-1333, February 2010.

[15] T. Hirokawa, E. Hiraki, T. Tanaka, M. Imai, K. Yasui, S. Sumiyoshi, "Dual-Frequency Multiple-Output Resonant Soft-Switching Inverter for Induction Heating Cooking Appliances," $39^{th}$ *Annual Conference of the IEEE Industrial Electronics Society (IECON* 2013), pp. 5028-5033, November 2013.

[16] H. Sarnago, O. Lucia, and J. M. Burdio, "Multiple-Output Boost Resonant Inverter for High Efficiency and Cost-Effective Induction Heating Applications," in *Proc. IEEE Appl. Power Electron. Conf.*, pp. 1040-1044, March 2016.

[17] The Qi Wireless Power Transfer System Power Class 0 Specification, Part 4: Reference Designs, *Wireless Power Consortium*, Version 1.2.2, April 2016.

[18] Datasheet: BQ500210, "Qi Compliant Wireless Power Transmitter Manager", Texas Instruments, 2012, http://www.ti.com/lit/ds/slusal8c/slusal8c.pdf

What is claimed is:

1. A system for generating multiple independent alternating current (AC) voltages from a direct current (DC) voltage source in a single-inductor multiple-output (SIMO) inverter, the system comprising:
   a DC voltage source for providing electrical energy;
   a front-stage DC-DC power converter comprising exactly one inductor as an energy storage element for power conversion and a main switching element;
   a plurality of selectable output branches, wherein each output branch comprises an output selection switch, a resonant tank, and a transmitter coil, wherein the resonant tank converts output power of the DC-DC power converter into an AC power for feeding the transmitter coil; and
   a controller for determining ON/OFF states of the main switching element and the output selection switch of each of the output branches, wherein current of the inductor of the DC-DC power converter is controlled by the main switching element in a discontinuous current mode (DCM);
   wherein each output branch comprises a voltage sensor to provide a voltage signal as a control signal; and
   wherein the voltage sensor is a peak voltage detector.

2. The system according to claim 1, further comprising output branch sensors for the output branches for providing feedback control signals to the controller.

3. The system according to claim 1, further comprising a current sensor for sensing the current of the inductor of the DC-DC power converter to provide main control signals for the system.

4. The system according to claim 3, wherein the current sensor measures current pulses of the inductor of the DC-DC power converter.

5. The system according to claim 3, wherein the current sensor provides current pulse signals that are synchronized with operating frequency for controlling switching states of the output selection switches, along with enable signals of logical circuits for the corresponding output branches.

6. The system according to claim 1, wherein the DC-DC power converter is a switched mode power electronic circuit.

7. The system according to claim 6, wherein the DC-DC power converter is a buck power converter, a boost power converter, a buck-boost power converter, or a derivative thereof.

8. The system according to claim 1, wherein the resonant tank comprises an inductor and a capacitor connected in parallel, and wherein AC voltage across the capacitor is fed to the transmitter coil.

9. The system according to claim 1, wherein the peak voltage detector comprises a diode and a capacitor connected to each other in series, and a resistor connected in parallel with the capacitor for determining a discharge time constant of the peak voltage detector, and wherein the voltage of the diode and the capacitor represents a peak voltage.

10. The system according to claim 1, wherein a voltage of the resonant tank is sensed and compared with a reference voltage to obtain a voltage difference, and the voltage difference is then based upon to derive a duty cycle of the main switching element of the DC-DC power converter by a pulse-width-modulation (PWM) circuit.

11. The system according to claim 10, wherein the voltage difference is multiplexed and fed to the PWM circuit.

12. The system according to claim 10, wherein the voltage difference is proportional to the duty cycle of the main switching element of DC-DC power converter, and wherein the duty cycle of the main switching element is proportional to a peak current of the inductor of the DC-DC power converter.

13. The system according to claim 10, wherein an output voltage of each resonant tank is a peak voltage of the resonant tank.

14. The system according to claim 1, wherein the current of the inductor of the DC-DC power converter is controlled by the main switching element in the discontinuous current mode (DCM) to provide a soft-switching condition for the main switching element and to reduce cross-interference in control of the output branches.

15. The system according to claim 14, wherein current pulses of the inductor are directed to the output branches through control of the output selection switches.

16. The system according to claim 1, wherein the output selection switches are controlled such that no more than one output selection switch is turned on at any instant, and such that an input current of the inductor of the DC-DC power convertor is delivered to the output branches in sequence to provide electric power for the output branches.

17. The system according to claim 1, wherein the main switching element of the DC-DC power converter is switched at integer multiples of a resonant frequency of the resonant tanks.

18. The system according to claim 1, wherein the transmitter coils provide wireless power for one or more loads that have a receiver coil tuned at a resonant frequency of the resonant tanks.

19. The system according to claim 18, wherein the one or more loads comprise a portable electronic product with a compatible receiver coil, a heating utensil suitable for inductive cooking, or both.

20. The system according to claim 1, wherein, in each output branch, an inductance of the transmitter coil is larger than that of an inductor of the resonant tank, such that a resonant frequency of the resonant tank does not change significantly when the transmitter coil is loaded.

21. A control method for generating multiple independent AC voltages from a DC voltage source in a SIMO inverter based on a system according to claim 1 that further comprises output branch sensors for the output branches for providing feedback control signals to the controller and a current sensor for sensing the current of the inductor of the DC-DC power converter to provide main control signals for the system, the method comprising:
   receiving, by the controller, the feedback control signals from the output branch sensors and the main control signals from the current sensor; and
   determining, by the controller, the ON/OFF states of the main switching element of the DC-DC power converter based on the main control signals from the current sensor; and
   determining, by the controller, the ON/OFF states of the output selection switches of the output branches based on the feedback control signals from the output branch sensors.

* * * * *